US012792032B2

(12) United States Patent
Lee et al.

(10) Patent No.: US 12,792,032 B2
(45) Date of Patent: Nov. 10, 2026

(54) BUILDING SYSTEM WITH EQUIPMENT RELIABILITY MODELING AND PROACTIVE CONTROL

(71) Applicant: Tyco Fire & Security GmbH, Neuhausen am Rheinfall (CH)

(72) Inventors: Young M. Lee, Old Westbury, NY (US); Wenwen Zhao, Santa Clara, CA (US); Arunkumar Vedhathiri, Albany, NY (US); Aditya Varma Penmetsa, Jurong (SG); Yulizar Rachmat, Jurong (SG)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 650 days.

(21) Appl. No.: 18/214,945

(22) Filed: Jun. 27, 2023

(65) Prior Publication Data

US 2023/0418281 A1 Dec. 28, 2023

(30) Foreign Application Priority Data

Jun. 28, 2022 (SG) .......................... 10202250321D

(51) Int. Cl.

*G05B 23/02* (2006.01)
*G06Q 10/0631* (2023.01)
*G06Q 10/0635* (2023.01)

(52) U.S. Cl.

CPC ..... *G05B 23/0283* (2013.01); *G05B 23/0251* (2013.01); *G06Q 10/06315* (2013.01); *G06Q 10/0635* (2013.01)

(58) Field of Classification Search

CPC ........... G05B 23/0283; G05B 23/0251; G05B 2219/2614; G05B 23/0297; G06Q 10/06315; G06Q 10/0635; G06Q 10/20

See application file for complete search history.

(56) References Cited

U.S. PATENT DOCUMENTS

| | | | |
|---|---|---|---|
| 10,341,132 | B2 | 7/2019 | Schubert et al. |
| 10,890,904 | B2 | 1/2021 | Turney et al. |
| 11,120,411 | B2 | 9/2021 | Turney et al. |
| 11,188,039 | B2 | 11/2021 | Murugesan et al. |

(Continued)

FOREIGN PATENT DOCUMENTS

| | | | |
|---|---|---|---|
| WO | WO-2021/016264 | A1 | 1/2021 |
| WO | WO-2021/050691 | A1 | 3/2021 |
| WO | WO-2022/197964 | A1 | 9/2022 |

OTHER PUBLICATIONS

U.S. Appl. No. 17/710,443, filed Mar. 31, 2022, Samy et al.

*Primary Examiner* — Lee E Rodak
*Assistant Examiner* — Byung Ro Lee
(74) *Attorney, Agent, or Firm* — Foley & Lardner LLP

(57) ABSTRACT

A method for affecting operation of building equipment includes providing a plurality of reliability models that model failure probabilities of components of the building equipment as functions of equipment runtime, providing associations of the components with a plurality of subsystems of the building equipment, calculating, for the plurality of subsystems of the building equipment, probabilities of subsystem failure based on the reliability models for the components and the associations, and initiating an automated action to affect operation of the building equipment based on the probabilities of subsystem failure.

19 Claims, 21 Drawing Sheets

(56) References Cited

U.S. PATENT DOCUMENTS

| | | | | |
|---|---|---|---|---|
| 11,256,223 | B2 | 2/2022 | Guthrie et al. | |
| 11,402,116 | B2 | 8/2022 | Papadopoulos et al. | |
| 11,409,274 | B2 | 8/2022 | Wenzel et al. | |
| 11,416,955 | B2 | 8/2022 | Elbsat et al. | |
| 11,480,932 | B2 | 10/2022 | Papadopoulos | |
| 11,519,620 | B2 | 12/2022 | Vitullo et al. | |
| 11,567,490 | B2 | 1/2023 | Khalate et al. | |
| 11,599,071 | B2 | 3/2023 | Vitullo | |
| 11,630,453 | B2 | 4/2023 | Vitullo et al. | |
| 11,636,429 | B2 | 4/2023 | Wenzel et al. | |
| 2016/0146493 | A1* | 5/2016 | Ettl | F24F 11/62 700/29 |
| 2018/0067635 | A1 | 3/2018 | Zummo | |
| 2018/0102958 | A1 | 4/2018 | Guthrie et al. | |
| 2019/0325368 | A1 | 10/2019 | Turney et al. | |
| 2019/0347622 | A1 | 11/2019 | Elbsat et al. | |
| 2020/0084601 | A1* | 3/2020 | Garrity | H04W 4/35 |
| 2020/0301408 | A1 | 9/2020 | Elbsat et al. | |
| 2020/0356087 | A1 | 11/2020 | Elbsat et al. | |
| 2021/0016874 | A1 | 1/2021 | Nowakowski | |
| 2021/0191378 | A1* | 6/2021 | Amores | G06F 16/11 |
| 2021/0200173 | A1 | 7/2021 | Ploegert et al. | |
| 2022/0044338 | A1 | 2/2022 | Smith | |
| 2022/0137580 | A1 | 5/2022 | Burroughs et al. | |
| 2022/0186962 | A1 | 6/2022 | Turney et al. | |
| 2022/0197235 | A1 | 6/2022 | Warake et al. | |
| 2022/0284519 | A1 | 9/2022 | Pancholi et al. | |
| 2022/0299963 | A1 | 9/2022 | Waghmare et al. | |
| 2023/0047122 | A1 | 2/2023 | Vitullo et al. | |
| 2023/0116641 | A1 | 4/2023 | Patil et al. | |
| 2023/0145448 | A1 | 5/2023 | Huber et al. | |
| 2023/0152755 | A1 | 5/2023 | Lee | |
| 2023/0153490 | A1 | 5/2023 | Lee et al. | |
| 2023/0206091 | A1 | 6/2023 | Pourmohammad et al. | |

* cited by examiner

800

802

| PRODUCT PART DESCRIPTION | SHIP DATE | FAIL DATE | RUN TIME | COMPONENT DESCRIPTION | START DATE | MANUFACTURE SITE | PRODUCT IDENTIFIER | LOCATION |
|---|---|---|---|---|---|---|---|---|
| (YVWA) SCREW CHILLER | 05/03/2013 | 12/12/2014 | 581 | MAIN DISPLAY, 10 IN. | 05/10/2013 | MTY | 1778 | 500 PLACE D'ARMES |
| (YVWA) SCREW CHILLER | 05/03/2013 | 01/20/2015 | 620 | TRANSDUCER, CONDENSER 0-400 LBS. | 05/10/2013 | MTY | 1778 | 500 PLACE D'ARMES |
| (YVWA) SCREW CHILLER | 05/03/2013 | 01/24/2018 | 1720 | TRANSDUCER, CONDENSER 0-400 LBS. | 05/10/2013 | MTY | 1778 | 500 PLACE D'ARMES |
| (YK) CENTRIFUGAL CHILLER | 01/02/1999 | 07/03/2004 | 2006 | EVAPORATOR, 0-200 LBS. | 01/06/1999 | MTY | 1761 | 777 E. WASHINGTON |
| (YCWL) SCROLL CHILLER | 07/02/2011 | 11/03/2011 | 93 | WIRING HARNESS, 10 PIN | 08/03/2011 | MTY | 270 | 777 E. WASHINGTON |
| (YZ) MAGNETIC BEARING CENTRIFUGAL CHILLER | 02/02/2014 | | 2660 | | 03/06/2014 | MTY | 2111 | 512 E. GILMAN |

804

A

FIG. 8A

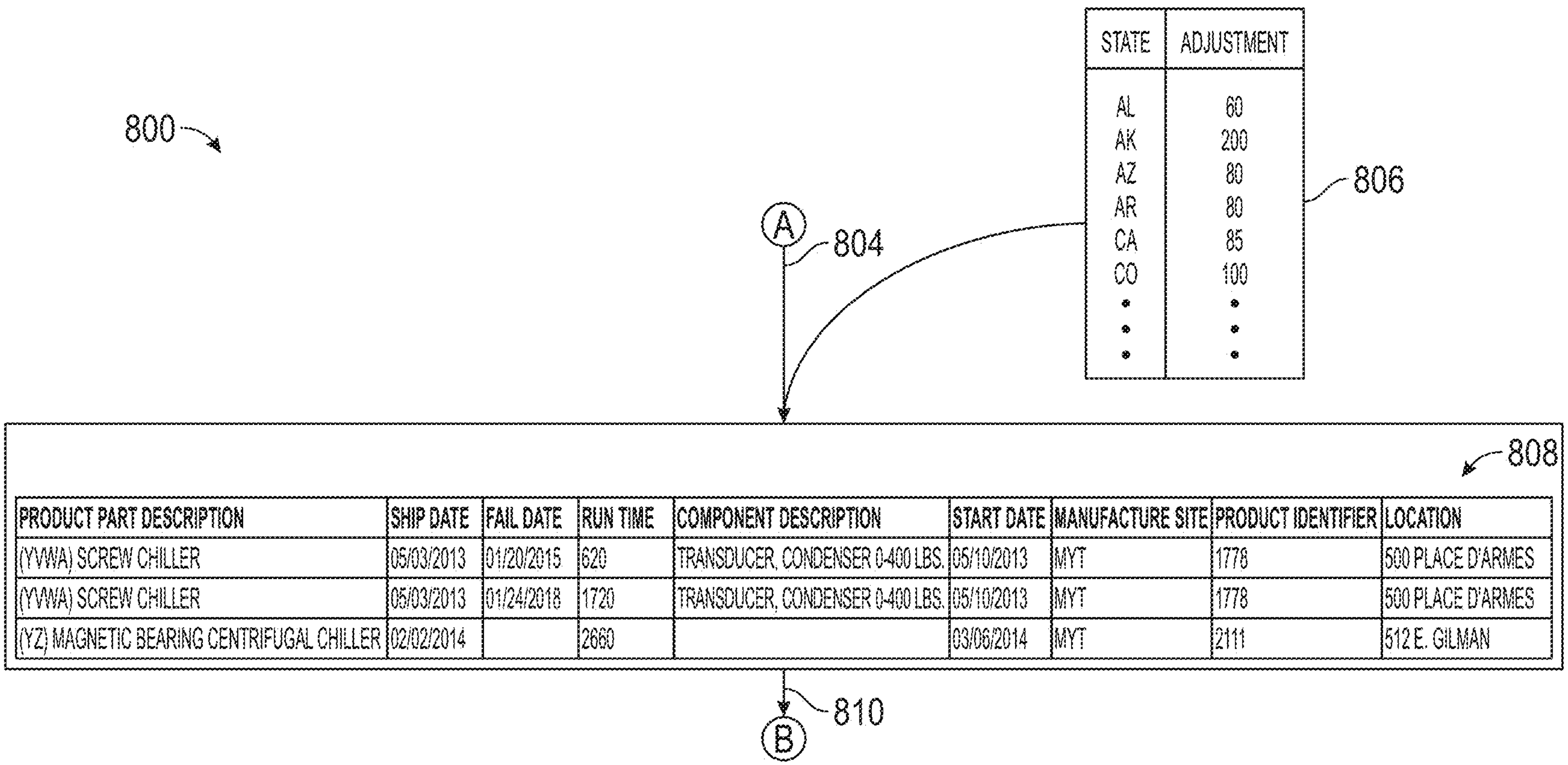

| STATE | ADJUSTMENT |
|---|---|
| AL | 60 |
| AK | 200 |
| AZ | 80 |
| AR | 80 |
| CA | 85 |
| CO | 100 |
| • | • |
| • | • |
| • | • |

| PRODUCT PART DESCRIPTION | SHIP DATE | FAIL DATE | RUN TIME | COMPONENT DESCRIPTION | START DATE | MANUFACTURE SITE | PRODUCT IDENTIFIER | LOCATION |
|---|---|---|---|---|---|---|---|---|
| (YVWA) SCREW CHILLER | 05/03/2013 | 01/20/2015 | 620 | TRANSDUCER, CONDENSER 0-400 LBS. | 05/10/2013 | MYT | 1778 | 500 PLACE D'ARMES |
| (YVWA) SCREW CHILLER | 05/03/2013 | 01/24/2018 | 1720 | TRANSDUCER, CONDENSER 0-400 LBS. | 05/10/2013 | MYT | 1778 | 500 PLACE D'ARMES |
| (YZ) MAGNETIC BEARING CENTRIFUGAL CHILLER | 02/02/2014 | | 2660 | | 03/06/2014 | MYT | 2111 | 512 E. GILMAN |

FIG. 8B

800

D

818

| BRANCHNAME | CUSTOMERNAME | MODELNAME | ASSETID | FAILURE_COMPONENT_DESC | LASTVAL | RUNHOURS | FAILURE PROBABILITY | MTBF IN YEARS |
|---|---|---|---|---|---|---|---|---|
| ALLENTOWN PA-ON38 | EAST PENN MFG CO | YK-WITH VARIABLE SPEED DRIVE | 45B70558-F06B-4FF2-8 | PIPING/LEAKS AT JOBSITE | 2021-01-03 | 45,510 | 98.3% | 3.76 |
| ALLENTOWN PA-ON38 | EAST PENN MFG CO | YK-WITH VARIABLE SPEED DRIVE | ECBACE25-2693-4343- | PIPING/LEAKS AT JOBSITE | 2021-01-03 | 47,541 | 99.5% | 3.76 |
| ALLENTOWN PA-ON38 | EAST PENN SCHOOL DISTRICT | YT-WITH VARIABLE SPEED DRIVE_VERSI | 4170D13C-8E63-479C- | PIPING/LEAKS AT JOBSITE | 2021-01-03 | 56,557 | 100.0% | 3.76 |
| ALLENTOWN PA-ON38 | EAST PENN MFG CO | YK-WITH VARIABLE SPEED DRIVE | 81A10668-8E35-41BC- | PIPING/LEAKS AT JOBSITE | 2021-01-03 | 49,266 | 99.8% | 3.76 |
| ALLENTOWN PA-ON38 | EAST PENN MFG CO | YT-WITH VARIABLE SPEED DRIVE | 82078A88-512F-4475-A | LEVEL INDICATOR | 2021-01-03 | 127,315 | 92.2% | 6.05 |
| ALLENTOWN PA-ON38 | EAST PENN MFG CO | YT-WITH VARIABLE SPEED DRIVE | 82078A88-512F-4475-A | ACTUATOR VGD/PRV | 2021-01-03 | 127,315 | 98.6% | 4.25 |
| ALLENTOWN PA-ON38 | EAST PENN MFG CO | YT-WITH VARIABLE SPEED DRIVE | 82078A88-512F-4475-A | ACTUATOR | 2021-01-03 | 127,315 | 99.3% | 5.70 |
| ALLENTOWN PA-ON38 | EAST PENN MFG CO | YT-WITH VARIABLE SPEED DRIVE | 82078A88-512F-4475-A | CONTROL SAFETY FLOW SWITCH | 2021-01-03 | 127,315 | 99.7% | 3.92 |
| ALLENTOWN PA-ON38 | EAST PENN MFG CO | YT-WITH VARIABLE SPEED DRIVE | 82078A88-512F-4475-A | MOTOR OPEN | 2021-01-03 | 127,315 | 98.6% | 4.39 |
| ALLENTOWN PA-ON38 | EAST PENN MFG CO | YT-WITH VARIABLE SPEED DRIVE | 82078A88-512F-4475-A | TEMPERATURE PROBE WATER | 2021-01-03 | 127,315 | 99.5% | 5.01 |
| ALLENTOWN PA-ON38 | EAST PENN MFG CO | YT-WITH VARIABLE SPEED DRIVE | 82078A88-512F-4475-A | MOTOR VALVE | 2021-01-03 | 127,315 | 99.5% | 4.93 |
| ALLENTOWN PA-ON38 | EAST PENN MFG CO | YT-WITH VARIABLE SPEED DRIVE | 82078A88-512F-4475-A | FILTER LOGIC BOARD | 2021-01-03 | 127,315 | 94.9% | 4.62 |
| ALLENTOWN PA-ON38 | EAST PENN MFG CO | YT-WITH VARIABLE SPEED DRIVE | 82078A88-512F-4475-A | PIPING/LEAKS AT JOBSITE | 2021-01-03 | 127,315 | 100.0% | 3.76 |
| ALLENTOWN PA-ON38 | EAST PENN MFG CO | YT-WITH VARIABLE SPEED DRIVE | 82078A88-512F-4475-A | INLET VANES | 2021-01-03 | 127,315 | 100.0% | 6.60 |
| ALLENTOWN PA-ON38 | EAST PENN MFG CO | YK-WITH VARIABLE SPEED DRIVE | C4D07802-A0B8-408C- | CONTROL SAFETY FLOW SWITCH | 2021-01-03 | 72,745 | 92.4% | 3.92 |
| ALLENTOWN PA-ON38 | EAST PENN MFG CO | YK-WITH VARIABLE SPEED DRIVE | C4D07802-A0B8-408C- | PIPING/LEAKS AT JOBSITE | 2021-01-03 | 72,745 | 100.0% | 3.76 |
| ALLENTOWN PA-ON38 | BIMBO BAKERIES USA INC | YCIV-2 COMPRESSORS | 13AF77C7-287E-4A87- | MICROCHANNEL GLYCOL COIL | 2021-01-03 | 100,819 | 98.6% | 6.81 |
| ALLENTOWN PA-ON38 | PALRAM AMERICAS | YCAV-2 COMPRESSORS | 9AB8B02E-DB77-4E9B- | MICROCHANNEL GLYCOL COIL | 2021-01-03 | 102,208 | 98.9% | 6.81 |

FIG. 8E

1000

| CHILLER TYPE | COMPONENT (FAILURE_COMPONENT _DESC) | MTBF (WITHOUT CENSORED DATA) | MTBF (WITH CENSORED DATA) | B(10) LIFE | X | B(X) LIFE | RELIABILITY AT 1 YEAR | BETA (WEIBULL) | ETA (WEIBULL) | R2 (WEIBULL) | P-VALUE (WEIBULL) | SAMPLE SIZE | SIMULATION T (DAY) | RELIABILITY (T) |
|---|---|---|---|---|---|---|---|---|---|---|---|---|---|---|
| AIR COOLED SCREW CHILLER | ACTUATOR | 372 | 1,470 | 601 | 80 | 2,057 | 0.9657872 | 2.21714807 | 1659.655785 | 0.44309172 | 3.22E-05 | 7012 | 365 | 96.58% |
| | ANGLE VALVE | 372 | 2,011 | 939 | 80 | 2,728 | 0.99064202 | 2.55676337 | 2264.67175 | 0.88369673 | 6.36222E-08 | 6996 | 365 | 99.06% |
| | BRACKETS | 371 | 1,297 | 443 | 80 | 1,881 | 0.92939245 | 1.88469263 | 1461.155329 | 0.81166404 | 0.000913765 | 6989 | 365 | 92.94% |
| | CIRCUIT BREAKER | 381 | 1,526 | 597 | 80 | 2,156 | 0.96365559 | 2.12407488 | 1722.883692 | 0.62405342 | 2.77E-08 | 9083 | 365 | 96.37% |
| | COIL COOLING | 383 | 1,509 | 462 | 80 | 2,229 | 0.93233323 | 1.73218964 | 1693.517653 | 0.67687889 | 1.44E-21 | 9132 | 365 | 93.23% |
| | COILS/MICROCHANNEL | 394 | 1,651 | 440 | 80 | 2,488 | 0.9243576 | 1.57259678 | 1838.594718 | 0.64790773 | 1.11E-34 | 7799 | 365 | 92.44% |
| | COMPRESSOR SEMI-HERMETIC SCREV | 384 | 1,288 | 479 | 80 | 1,838 | 0.94121404 | 2.02895917 | 1453.522477 | 0.8123028 | 3.50E-58 | 9206 | 365 | 94.12% |
| | CONDENSER COIL | 389 | 1,685 | 551 | 80 | 2,462 | 0.95147269 | 1.82141986 | 1895.875413 | 0.64276651 | 1.82E-27 | 9166 | 365 | 95.15% |
| | CONDENSER FAN MOTOR | 393 | 1,791 | 247 | 80 | 2,858 | 0.84968426 | 1.11309597 | 1863.468161 | 0.77558095 | 0 | 10082 | 365 | 84.97% |
| | CONTACTOR | 372 | 1,299 | 735 | 80 | 1,671 | 0.98977141. | 3.32145506 | 1448.144224 | 0.88878044 | 1.49788E-08 | 6997 | 365 | 98.98% |
| | CONTROL BOARD SCREW CHILLER | 383 | 1,368 | 506 | 80 | 1,955 | 0.94704062 | 2.01836044 | 1544.151409 | 0.78416205 | 1.03E-31 | 9141 | 365 | 94.70% |
| | CONTROL PANEL | 382 | 904 | 488 | 80 | 1,179 | 0.95803953 | 3.09165363 | 1010.967477 | 0.57956859 | 2.69E-07 | 9082 | 365 | 95.80% |
| | CONTROL SAFETY FLOW SWITCH | 385 | 1,382 | 485 | 80 | 1,995 | 0.9408343 | 1.92705446 | 1558.335905 | 0.71073992 | 4.81E-76 | 9326 | 365 | 94.08% |
| | CONTROL SAFETY HI PRESS | 381 | 926 | 776 | 80 | 1,021 | 0.99994326 | 9.9710824 | 973.0426058 | 0.68504379 | 0.041985789 | 9055 | 365 | 99.99% |
| | CONTROL SOLID STATE CAPACITY | 372 | 1,168 | 643 | 80 | 1,514 | 0.98263682 | 3.18583108 | 1303.936446 | 0.73376664 | 1.43E-06 | 7000 | 365 | 98.28% |
| | CRANKCASE HEATER | 384 | 1,259 | 519 | 80 | 1,758 | 0.95324478 | 2.23571184 | 1421.102684 | 0.5707782 | 2.67E-14 | 9120 | 365 | 95.32% |
| | DRIERS | 382 | 1,272 | 587 | 80 | 1,732 | 0.96869532 | 2.52013985 | 1433.860688 | 0.72437608 | 1.85E-08 | 9076 | 365 | 96.87% |
| | EDUCTOR | 369 | 2,930 | 397 | 80 | 4,678 | 0.90857347 | 1.10577043 | 3042.046525 | 0.75418354 | 4.42E-75 | 7222 | 365 | 90.86% |
| | EEV ELECTRONIC EXPANSION VALVE | 383 | 1,656 | 547 | 80 | 2,416 | 0.95112298 | 1.83568143 | 1864.270478 | 0.47817093 | 3.01 E-06 | 9085 | 365 | 95.11% |

FIG. 10

BUILDING SYSTEM WITH EQUIPMENT RELIABILITY MODELING AND PROACTIVE CONTROL

CROSS-REFERENCE TO RELATED APPLICATION

This application claims the benefit of and priority to Singapore Application No. 10202250321D filed Jun. 28, 2022, the entire disclosure of which is incorporated by reference herein.

BACKGROUND

The present disclosure relates generally to predicting faults or other anomalies for building components, such as heating, ventilation, and/or air conditioning (HVAC) components. In some implementations, the present disclosure relates more particularly to predicting building component (e.g., chiller) faults using models trained, for example, with machine learning (e.g., deep learning).

Chillers are often found in buildings and are components of HVAC systems. Chillers are subject to faults, which can cause unplanned shutdowns due to safety and other concerns. More specifically, chiller shutdowns may cause loss of efficiency, as well as damage to other expensive HVAC equipment during a shutdown. It is desirable to predict chiller shutdowns prior to shutdowns occurring.

Chiller faults are often unexpected and difficult to predict. Various factors may cause a chiller fault including overuse, required maintenance, safety concerns and environmental conditions, among other possible factors. With many factors capable of influencing sudden chiller faults, predicting future chiller failure is challenging.

SUMMARY

One implementation of the present disclosure is a method for affecting operation of building equipment. The method includes providing a plurality of reliability models that model failure probabilities of components of the building equipment as functions of equipment runtime, providing associations of the components with a plurality of subsystems of the building equipment, calculating, for the plurality of subsystems of the building equipment, probabilities of subsystem failure based on the reliability models for the components and the associations, and initiating an automated action to influence operation of the building equipment based on the probabilities of subsystem failure.

BRIEF DESCRIPTION OF THE DRAWINGS

FIGS. 8A-8F are a flow diagram illustrating data manipulation for generating an HVAC component reliability model, according to some embodiments.

FIG. 10 is a table illustrating a number of reliability metrics generated by the predictive maintenance system of FIG. 6, according to some embodiments.

DETAILED DESCRIPTION

Overview

Figure 1:
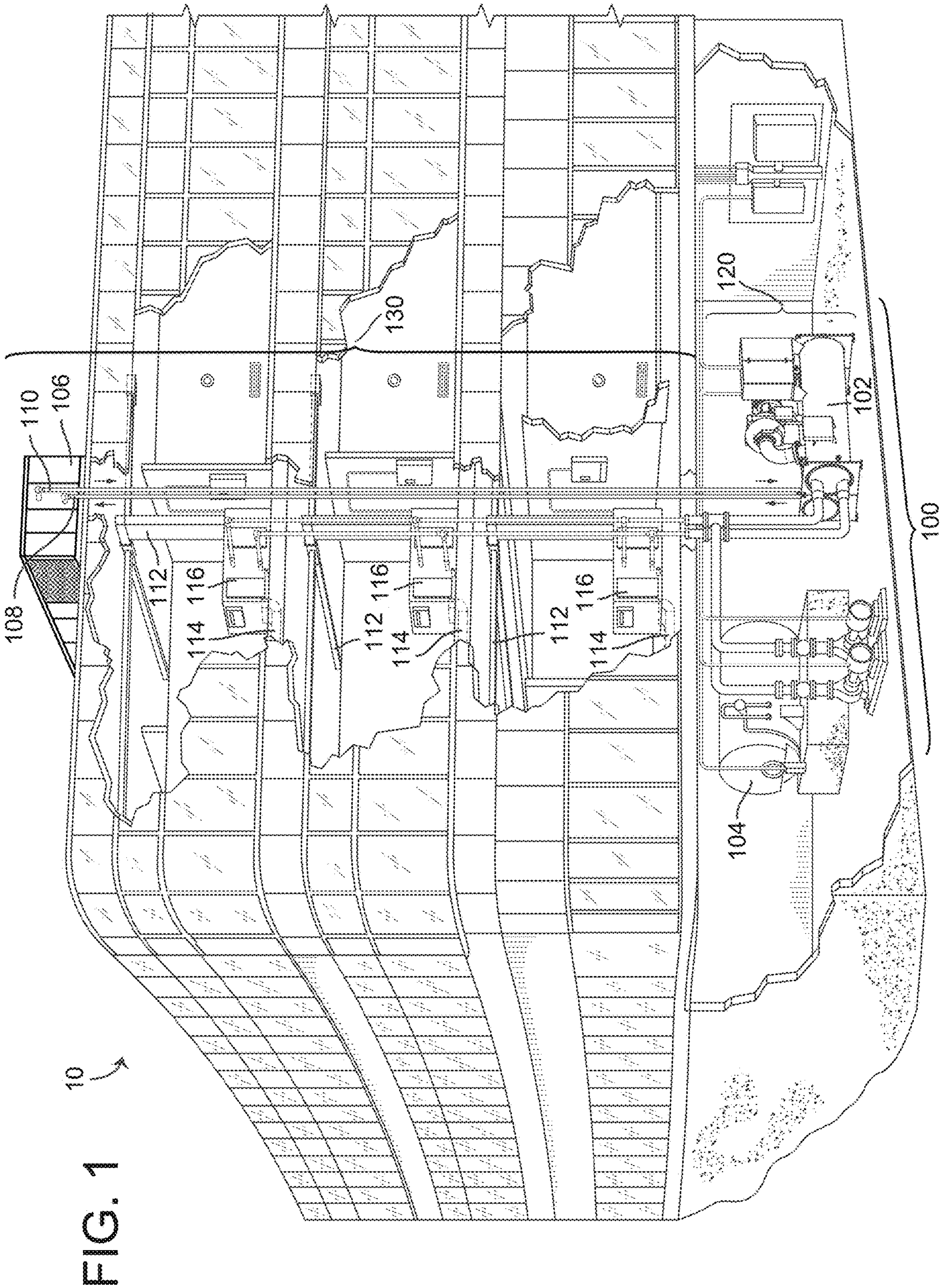
FIG. 1 is a drawing of a building equipped with a HVAC system, according to some embodiments.

Building equipment, such as HVAC systems/components, play a significant role in the functioning of a building. For example, employers may rely on HVAC equipment such as chillers to maintain a comfortable environment for employees during hot summer months. As another example, a restaurant may rely on a chiller to maintain a suitable environment for storing food ingredients and may suffer a significant loss (e.g., due to spoilage, etc.) if the chiller malfunctions. Moreover, in many scenarios HVAC equipment such as chillers significantly contribute to building energy consumption (e.g., make up half of building energy consumption, etc.). Therefore, it may be desirable to properly maintain HVAC equipment such as chillers to ensure optimal functionality and efficient performance (e.g., to prevent performance degradation due to faulty components and/or incorrect operation, etc.). For example, even temporary downtime of a chiller may lead to substantial financial losses (e.g., due to lost employee productivity, spoilage, knock-on component failures, etc.). Related features are described in U.S. patent application Ser. No. 17/530,257, filed Nov. 18, 2021, the entire disclosure of which is incorporated by reference herein.

HVAC equipment such as chillers may be equipped with sensors capable of collecting data regarding the functioning of the HVAC equipment. In various embodiments, the data is used to schedule maintenance to prevent downtime associated with HVAC events such as equipment failures (e.g., due to a failed cooling coil, etc.). Predicting equipment failures prior to their occurrence may save time and money.

In various embodiments, machine learning and/or statistical models may be used to predict equipment failures. For example, a machine learning and/or statistical model such as a Weibull model and/or a Cox model may be trained using data from sensors monitoring HVAC equipment and may predict equipment failures associated with the HVAC equipment before they occur.

However, the accuracy of machine learning and/or statistical models may rely on the quality of training data used to train the machine learning and/or statistical models. For example, a database of historical component failures may be used to train a machine learning model. To continue the example, if the database includes a large proportion of incorrect data (e.g., false-positive equipment failures, etc.), it may cause the machine learning model to incorrectly predict future equipment failures (e.g., overestimate the probability of future equipment failures, etc.). Therefore, there is a need for systems and methods to intelligently manipulate datasets for training machine learning and/or statistical models to predict equipment failures such as chiller failures. It should be understood that while the present disclosure is described with relation to HVAC chillers, the systems and methods of the present disclosure may be applied to any HVAC equipment/components and is not limited to HVAC chillers. Further, it should be understood that the techniques described herein may be applied to building equipment, building devices, and/or building device components other than HVAC equipment in some implementations.

In various embodiments, maintenance data such as a maintenance record extracted from warranty claim data may be used to train a machine learning and/or statistical model. For example, a runtime may be estimated from warranty claim data by comparing a date of a chiller failure to a date the chiller came online. To continue the example, the runtime may be used to train a Weibull model to predict the reliability of chiller components over time. Trained models may generate reliability metrics for individual chiller components, chillers, and/or chiller clusters (and/or other building devices/building device components, etc.). In various embodiments, existing datasets that may be used to train machine learning and/or statistical models may include inherent deficiencies. For example, warranty claim data includes information about chillers that have experienced component failure which may be repaired under the warranty agreement. Since the warranty claim data may only account for chillers that have components that have failed, the warranty claim data may incorrectly skew a machine learning model trained using the warranty claim data to overestimate the likelihood of chiller component failures. To avoid overestimating the likelihood of chiller component failure, warranty claim data and censored chiller data may be combined to be robust against a high false alarm failure rate. For example, taking into account only warranty claim data, the mean time between failures (MTBF) of a chiller may range from 0-5 years. On the other hand, when combining warranty claim data with censored chiller data, the MTBF may range from 25-250 years. Overestimating the likelihood of chiller components may cause unnecessary maintenance leading to an increase in costs for maintaining the chillers. Therefore, systems and methods of the present disclosure may use a combination of warranty claim data and censored chiller data to train the machine learning and/or statistical model to predict the reliability of the chiller components without overestimating the likelihood of chiller component failure.

In various embodiments, HVAC equipment/building devices/building device components may follow a "bathtub curve" where equipment/component failures are more common early and late in an equipment/component lifetime. For example, a time-based failure probability for a chiller component may have a first portion associated with a first period of time and a first failure probability, a second portion associated with a second period of time and a second failure probability that is less than the first failure probability, and a third portion associated with a third period of time and a third failure probability that is greater than the second failure probability. In various embodiments, systems and methods of the present disclosure relate to predicting "wear-out" failures associated with the third portion of the time-based failure probability described above. Often, training data for a machine learning and/or statistical model such as warranty claim data may include a number of "early life failures" (e.g., component failures that occur within a threshold time period/number of days of bringing a chiller online such as the first 100 days of operation, etc.) related to the "infant mortality" period (e.g., the first 100 days). However, training a model for predicting wear-out failures using training data that includes infant mortality failures may cause the model to overestimate the likelihood of early-life failures and/or underestimate the lifespan of equipment/components. Therefore, in some embodiments, systems and methods of the present disclosure may trim training data to remove infant mortality data, thereby increasing the accuracy of the model for predicting wear-out failures.

In some scenarios, training data may be incomplete. For example, warranty claim data may omit a start date associated with a chiller. In various embodiments, a start date may be used to compute a runtime associated with a chiller. For example, a machine learning model may be trained with runtime data determined by subtracting from a failure date from a start date of a chiller (e.g., the date a chiller became operational for the first time, etc.), thereby determining a time between when a chiller starting functioning (e.g., when it was installed and turned on, etc.) and when it stopped functioning (e.g., due to a failure, etc.). Training a model with incomplete training data may cause the model to be inaccurate (e.g., poorly predict future equipment failures, etc.). Therefore, there is a need for systems and methods to dynamically determine proxy data for incomplete training data. Systems and methods of the present disclosure may update incomplete training data to approximate a missing start date for a chiller using an install date and/or a manufactured date associated with the chiller (and/or other building devices/building device components, etc.). For example, systems and methods of the present disclosure may approximate a start date using an installation date included in warranty claim data.

In some scenarios, as described above, runtime data may be used to train a machine learning and/or statistical model to predict equipment/component reliability metrics. In some embodiments, runtime is determined by computing an elapsed time between when a failure occurs and when a piece of equipment came online (e.g., began operating, etc.). Computing the elapsed time may include subtracting a start date from a failure date. However, subtracting a start date from a failure date may overestimate a runtime of equipment/components. For example, a chiller located in Vermont may only be running during a portion of the year (e.g., the summer months, etc.) and may be idle otherwise. To continue the example, subtracting a start date from a failure date may not account for the idle time associated with the chiller, thereby overestimating the amount of time the chiller was actually running (e.g., operating, etc.). Therefore, there is a need for systems and methods to intelligently calibrate runtimes associated with equipment/components to more accurately capture an amount of operating time associated with the equipment/components. Systems and methods of the present disclosure may calibrate equipment/component runtimes using climate data. For example, systems and methods of the present disclosure may determine temperature patterns for an area in which a chiller is installed and use the temperature patterns to update a runtime associated with the chiller to account for a period of time the chiller was idle (e.g., because the temperature was low enough that the chiller wasn't needed to cool a space, etc.). In various embodiments, calibrating runtime data using climate data may improve an accuracy of a model trained using the runtime data as compared with existing solutions, thereby improving the field of predictive analytics for HVAC equipment/components.

In some scenarios, training data may include uncommon equipment/component failures. For example, training data may include data describing a component threading that becomes stripped once in every one-hundred thousand components. In some embodiments, uncommon equipment/component failures may fail to be statistically significant (e.g., have a low occurrence, etc.). Using data that is statistically insignificant to train a model may introduce noise to the model and cause the model to be less accurate. Therefore, there is a need for systems and methods to identify statistically insignificant data in training data. Systems and methods of the present disclosure may analyze training data to trim equipment/component failures that are statistically insignificant (e.g., occur less than a threshold number of times, etc.).

One implementation of the present disclosure is a method for generating a reliability model, comprising receiving, by a processing circuit, historical operating data associated with one or more chillers or chiller components, the historical operating data including two or more event dates associated with the one or more chillers, calculating, by the processing circuit, a runtime of a chiller of the one or more chillers based on the two or more event dates, calibrating, by the processing circuit, the runtime by determining an idle time associated with the chiller corresponding to a location of the chiller and performing an operation using the runtime and the idle time to generate a calibrated runtime, and training, by the processing circuit, a chiller reliability model using the calibrated runtime to produce a trained model.

In some embodiments, performing the operation includes subtracting the idle time from the runtime to generate the calibrated runtime. In some embodiments, training the chiller reliability model includes training at least one of (i) a Weibull model or (ii) a Cox model using the calibrated runtime to produce the trained model. In some embodiments, the method further comprises generating, by the processing circuit, a reliability metric describing a mean time between failures (MTBF) associated with the chiller based on the trained model. In some embodiments, the two or more event dates include a failure date associated with a failure of the chiller and a start date associated with a day when the chiller came online, and wherein calculating the runtime of the chiller includes determining an amount of time between the failure date and the start date. In some embodiments, the method further comprises receiving, by the processing circuit, warranty claim data associated with one or more warranty claims associated with the one or more chillers or chiller components, and parsing, by the processing circuit, the warranty claim data to identify the historical operating data by generating the start date associated with the chiller based on at least one of (i) a shipping date associated with a day when the chiller was shipped to a location of operation or (ii) a manufacture date associated with when the chiller was manufactured.

In some embodiments, the method further comprises parsing, by the processing circuit, the historical operating data to identify an element in the historical operating data having at least one of (i) a runtime that is below a threshold runtime, (ii) an event date that is before a threshold event date, or (iii) a failure type that is included in a list of failure types that are below a threshold number of failures, and trimming, by the processing circuit, the element from the historical operating data in response. In some embodiments, training the chiller reliability model to produce the trained model includes determining a shape parameter and a scale parameter of a Weibull model.

Another implementation of the present disclosure is one or more non-transitory computer-readable storage mediums having instructions stored thereon that, when executed by one or more processors, cause the one or more processors to receive historical operating data associated with one or more chillers or chiller components, the historical operating data including two or more event dates associated with the one or more chillers, calculate a runtime of a chiller of the one or more chillers based on the two or more event dates, calibrate the runtime by (i) determining an idle time associated with the chiller corresponding to a location of the chiller and (ii) performing an operation using the runtime and the idle time to generate a calibrated runtime, and train a chiller reliability model using the calibrated runtime to produce a trained model.

In some embodiments, performing the operation includes subtracting the idle time from the runtime to generate the calibrated runtime. In some embodiments, training the chiller reliability model includes training at least one of (i) a Weibull model or (ii) a Cox model using the calibrated runtime to produce the trained model. In some embodiments, the instructions further cause the one or more processors to generate a reliability metric describing a mean time between failures (MTBF) associated with the chiller based on the trained model. In some embodiments, the two or more event dates include a failure date associated with a failure of the chiller and a start date associated with a day when the chiller came online, and wherein calculating the runtime of the chiller includes determining an amount of time between the failure date and the start date. In some embodiments, the instructions further cause the one or more processors to receive warranty claim data associated with one or more warranty claims associated with the one or more chillers or chiller components, and parse the warranty claim data to identify the historical operating data by generating the start date associated with the chiller based on at least one of (i) a shipping date associated with a day when the chiller was shipped to a location of operation or (ii) a manufacture date associated with when the chiller was manufactured. In some embodiments, the instructions further cause the one or more processors to parse the historical operating data to identify an element in the historical operating data having at least one of (i) a runtime that is below a threshold runtime, (ii) an event date that is before a threshold event date, or (iii) a failure type that is included in a list of failure types that are below a threshold number of failures, and trim the element from the historical operating data in response. In some embodiments, training the chiller reliability model to produce the trained model includes determining a shape parameter and a scale parameter of a Weibull model.

Another implementation of the present disclose is a predictive maintenance system comprising a processing circuit including a processor and memory, the memory having instructions stored thereon that, when executed by the processor, cause the processor to receive historical operating data associated with one or more chillers or chiller components, the historical operating data including two or more event dates associated with the one or more chillers, wherein the two or more event dates include a failure date associated with a failure of the chiller and a start date associated with a day when the chiller came online, calculate a runtime of a chiller of the one or more chillers based on the two or more event dates by determining an amount of time between the failure date and the start date, calibrate the runtime by determining an idle time associated with the chiller corresponding to a location of the chiller and subtracting the idle time from the runtime to generate a calibrated runtime, train a chiller reliability model using the calibrated runtime to produce a shape parameter and a scale parameter of a Weibull model, and generate a reliability metric describing a mean time between failures (MTBF) associated with the chiller using the shape parameter and the scale parameter of the Weibull model.

In some embodiments, training the chiller reliability model includes training a Cox model using the calibrated runtime. In some embodiments, the instructions further cause the processor to receive warranty claim data associated with one or more warranty claims associated with the one or more chillers or chiller components, and parse the warranty claim data to identify the historical operating data by generating the start date associated with the chiller based on at least one of (i) a shipping date associated with a day when the chiller was shipped to a location of operation or (ii) a manufacture date associated with when the chiller was manufactured. In some embodiments, the instructions further cause the processor to parse the historical operating data to identify an element in the historical operating data having at least one of (i) a runtime that is below a threshold runtime, (ii) an event date that is before a threshold event date, or (iii) a failure type that is included in a list of failure types that are below a threshold number of failures, and trim the element from the historical operating data in response.

Maintenance and service recommendations and interventions (e.g., automated actions) are often based on age of equipment, i.e., the number of years the equipment has been in operation. Examples of services that can be performed, for example on a chiller, include oil filter replacement, shaft seal replacement, thrust bearing inspection and replacement, etc. However, such age-based approach does not adapted to the specific utilization of a particular unit of equipment and can be at a high level of generality. One aspect of the present disclosure is a recognition that additional maintenance service recommendations, service offering, etc. with finer granularity and tuned to particular units of equipment using reliability models of components of the equipment could provide better maintenance recommendations and improve equipment uptime (by reducing or eliminating failures and down-time). Structuring of service offerings (e.g., parts inventories, staffing, work order generation, pricing, warranty terms, timing of service offers, etc.) can also be automatically crafted based on failure probabilities and associated risks as calculated herein. Equipment performance and uptime can thus be improved by the features herein, addressing technical challenges associated with failures (breakdowns, faults, down-time, loss, etc.) of building equipment which may otherwise cause discomfort for building occupants (too hot, too cold, to humid, unhealthy air, stagnate air, etc.) or other negative physical effects.

Another aspect of the present disclosure is a determination that the value of maintenance service for building equipment can be characterized as the avoidance of risk of equipment failure, i.e., the risk reduction (mitigation, etc.) resulting from performance of maintenance tasks. Service offerings can thus be structured based on probabilities of subsystem and/or component failures as described herein and associated costs of failures (e.g., combined to determine overall risk), for example structuring service contracts, staffing, parts inventories, work orders, warranty terms, automated interventions, etc. based on the value of maintenance service represented based on risk calculations disclosed herein. By accurately modeling risks for individual equipment units, determinations as to when it is economically feasible to intervene (e.g., initiate some automated action to reduce or mitigate the risk) can be made to reduce downtime, failures, etc. of equipment in a sustainable manner. Anticipating maintenance needs can allow for scheduling of maintenance at preferable times (e.g., outside occupied hours) which cannot be reliably accomplished is services is provided on an emergency basis in response to equipment failure.

Building and HVAC System

Referring now to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Figure 2:
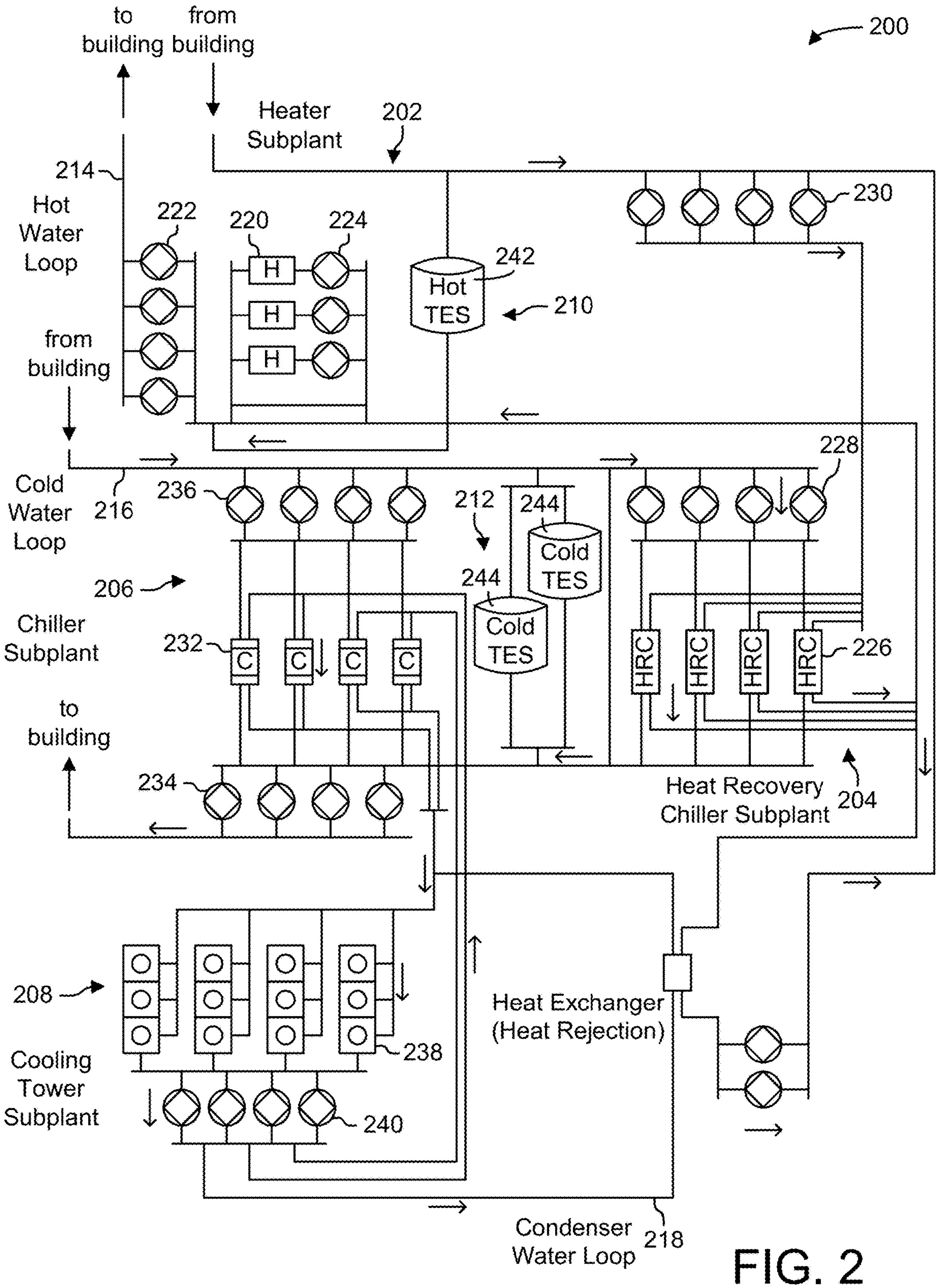
FIG. 2 is a schematic diagram of a waterside system which can be used in conjunction with the building of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Figure 3:
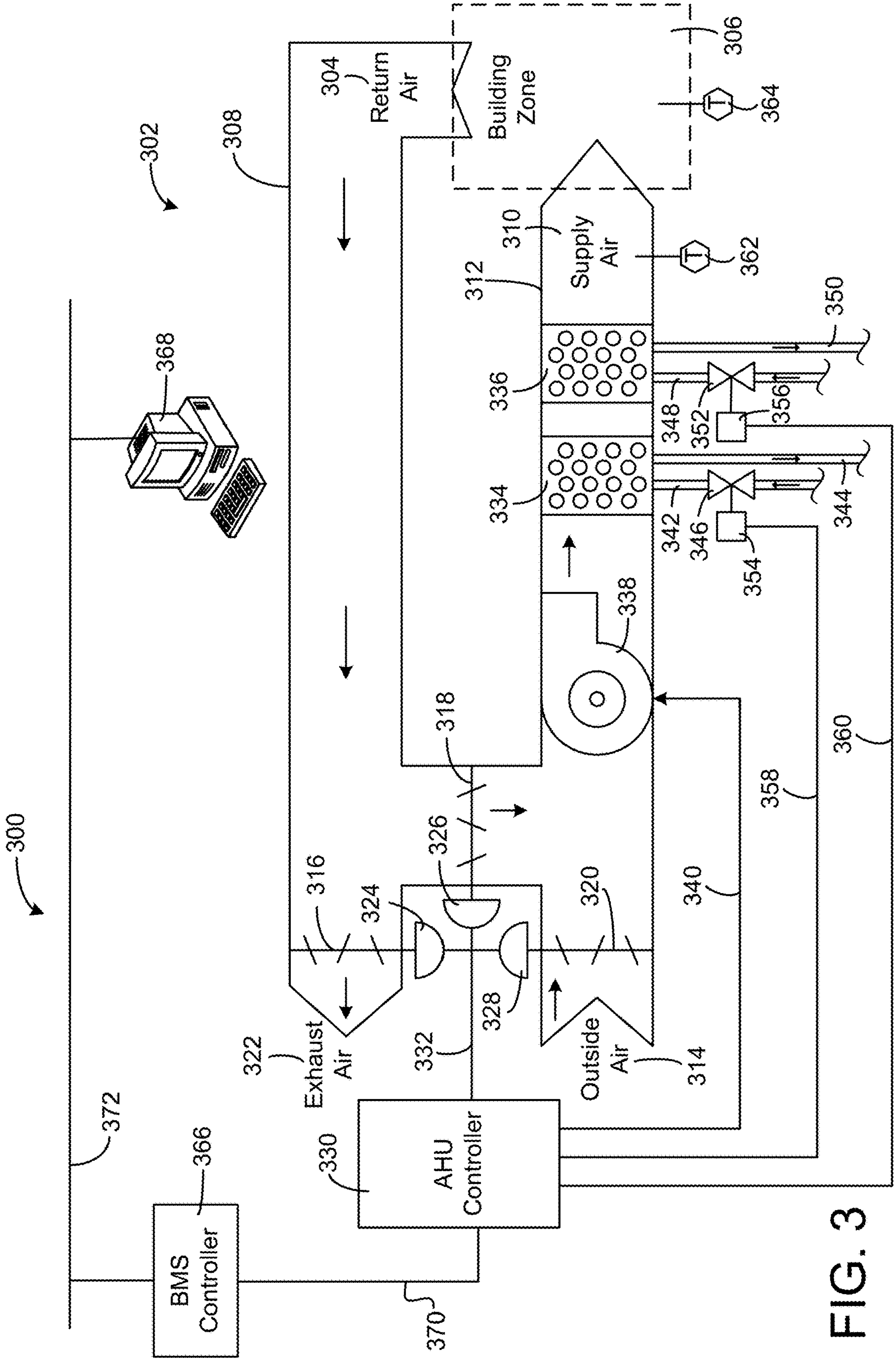
FIG. 3 is a schematic diagram of an airside system which can be used in conjunction with the building of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360.

Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Figure 4:
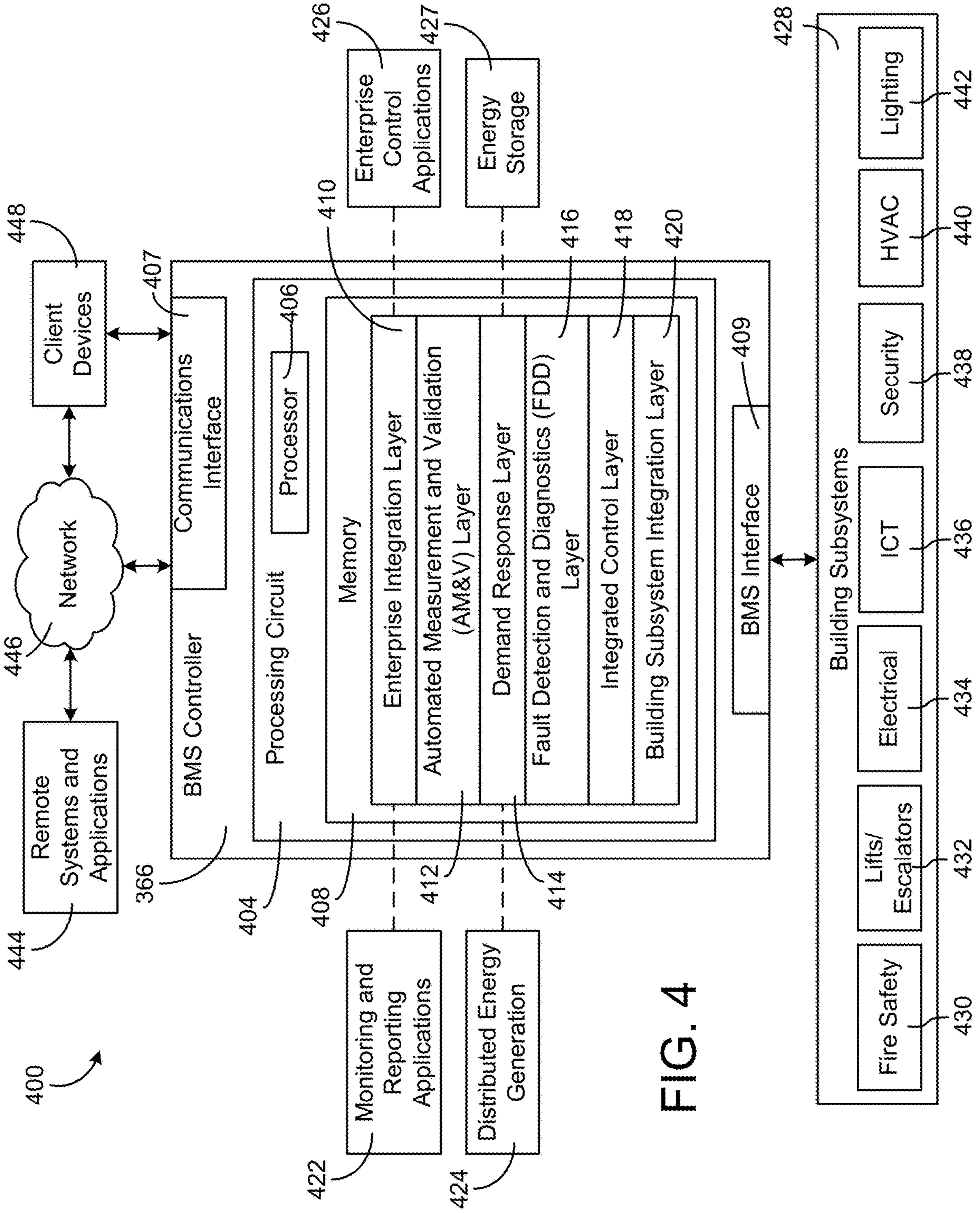
FIG. 4 is a block diagram of a building management system (BMS) which can be used to monitor and control the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In some embodiments, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint.

These processes can be examined by FDD layer 416 to expose when the system begins to degrade in performance and alert a user to repair the fault before it becomes more severe.

Figure 5:
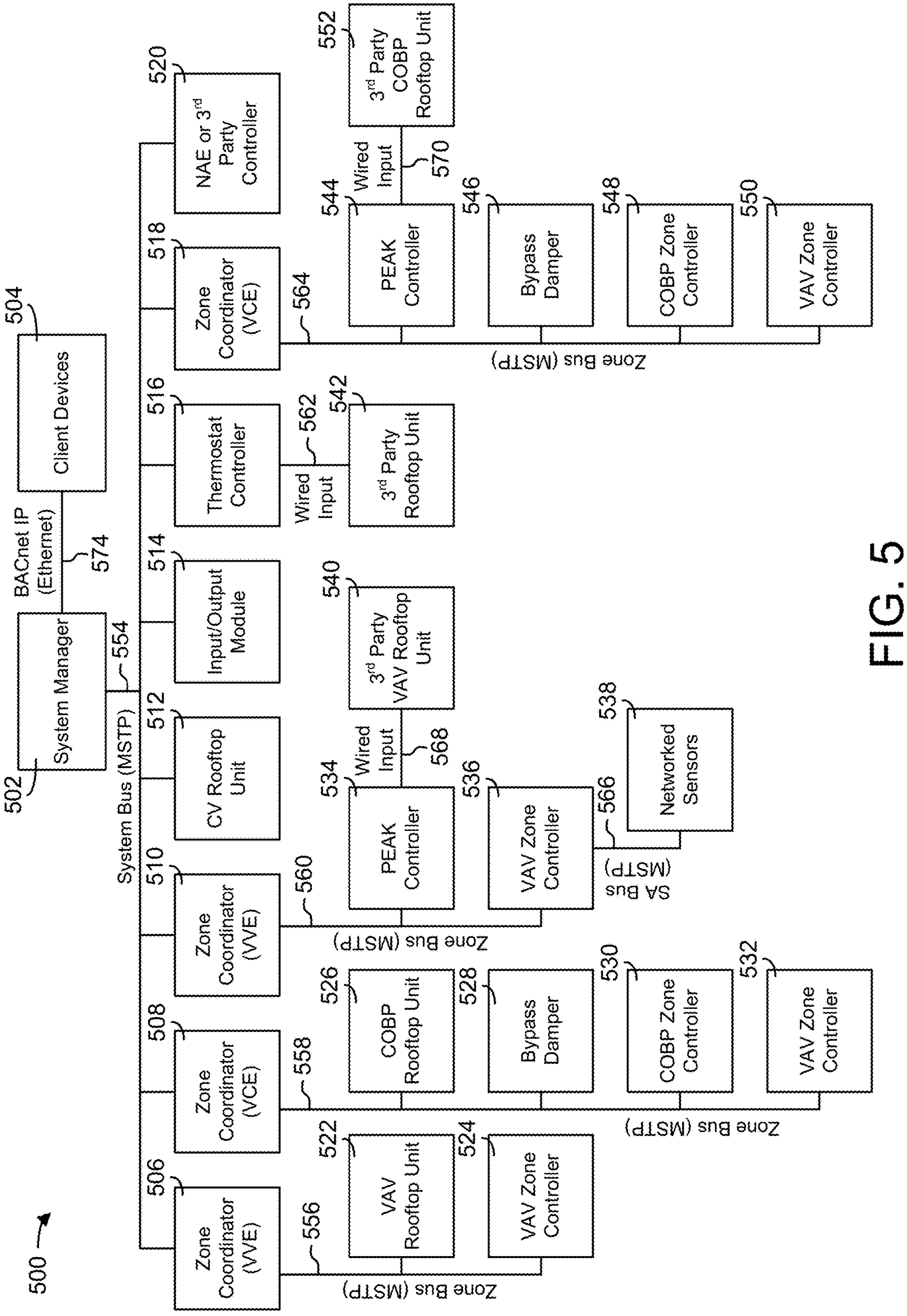
FIG. 5 is a block diagram of another BMS which can be used to monitor and control the building of FIG. 1, according to some embodiments.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Reliability Modeling

Figure 6:
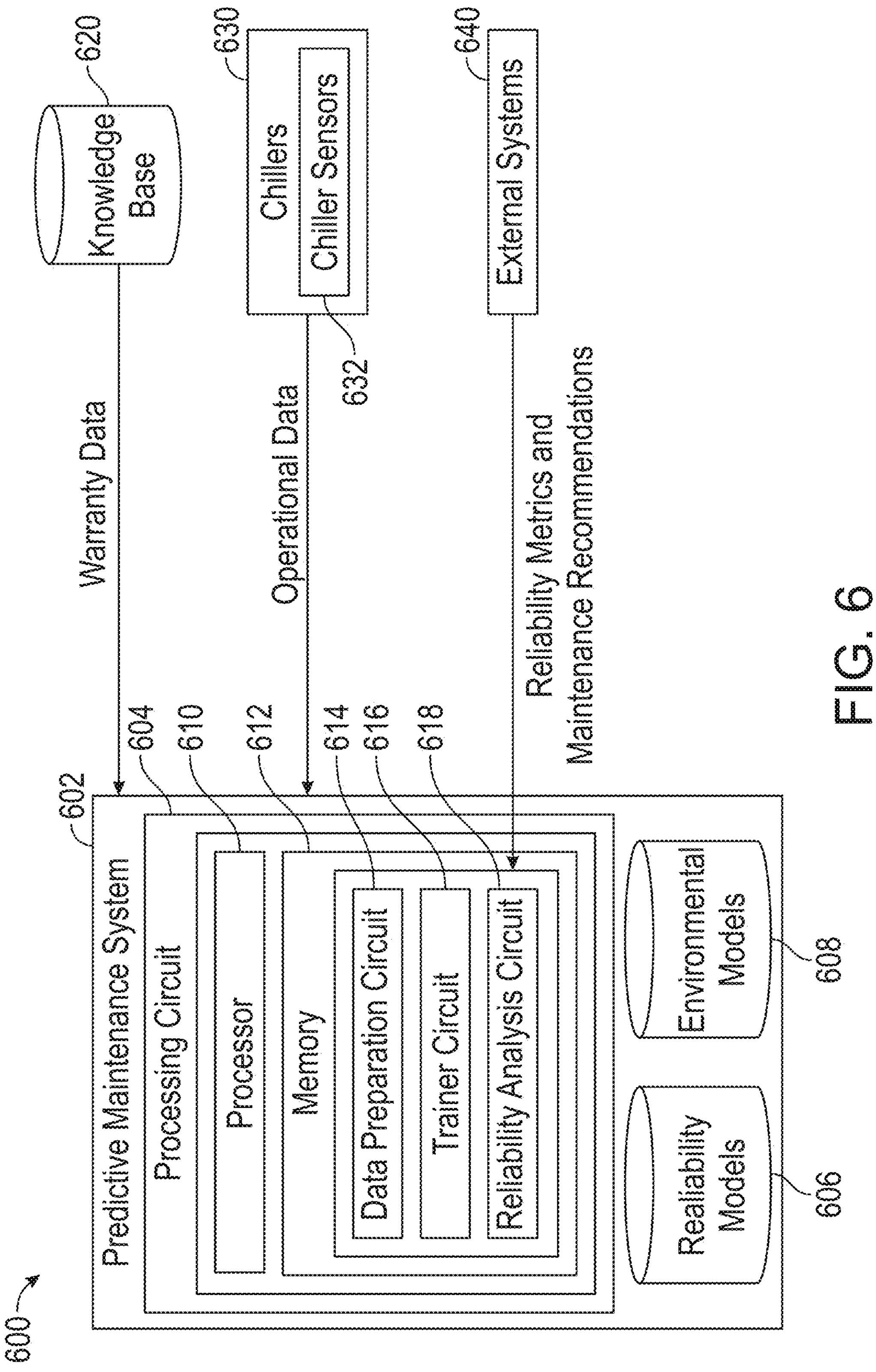
FIG. 6 is a block diagram of a predictive maintenance system for modeling HVAC component reliability, according to some embodiments.

Referring now to FIG. 6, system 600 for generating reliability metrics for building devices/building device components such as HVAC equipment (e.g., chillers, etc.) is shown, according to an exemplary embodiment. In various embodiments, system 600 trains one or more models using training data such as warranty claim data, operational data, and/or manufacturing, shipping, and install data to generate reliability metrics such as mean time between failure (MTBF), failure probability, time to X % failure, and/or the like. System 600 is shown to include predictive maintenance system 602, knowledge base 620, chillers 630, and external systems 640.

In some embodiments, components of system 600 communicate via a network (e.g., such as network 446 described above in relation to FIG. 4, etc.). Predictive maintenance system 602 may train a machine learning and/or statistical model such as a Weibull model and/or a Cox model to generate one or more trained models that can be used to generate reliability metrics. Predictive maintenance system 602 may include processing circuit 604, reliability models 606, and environmental models 608. Processing circuit 604 may include processor 610 and memory 612. Processor 610 may be implemented as a general purpose processor, an application specific integrated circuit (ASIC), one or more field programmable gate arrays (FPGAs), a group of processing components, or other suitable electronic processing components.

Memory 612 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 612 may be or include volatile memory or non-volatile memory. Memory 612 may include database components, object code components, script components, or any other type of information structure for supporting the various activities and information structures described in the present application. According to some embodiments, memory 612 is communicably connected to processor 610 via processing circuit 604 and includes computer code for executing (e.g., by processing circuit 604 and/or processor 610) one or more operations described herein. Memory 612 may include data preparation circuit 614, trainer circuit 616, and reliability analysis circuit 618. Data preparation circuit 614, trainer circuit 616, and reliability analysis circuit 618 may be implemented as software (e.g., computer-executable programming code, etc.), hardware (e.g., a logic circuit, etc.), and/or a combination thereof.

Data preparation circuit 614 may retrieve data from one or more sources and prepare the data for training a machine learning and/or statistical model. For example, data preparation circuit 614 may retrieve warranty claim data from knowledge base 620 and may compute and calibrate one or more runtimes based on the warranty claim data for use in training a model. In some embodiments, data preparation circuit 614 retrieves data such as historical operating data from knowledge base 620. Additionally or alternatively, data preparation circuit 614 may retrieve data such as operational data from chillers 630. In some embodiments, data preparation circuit 614 may retrieve additional data such as climate data from external systems 640.

In various embodiments, data preparation circuit 614 may compute a runtime associated with equipment/components included in historical operating data. For example, data preparation circuit 614 may implement the function:

$$\text{runtime} = \text{failure date} - \text{start date}$$

where start date corresponds to the date a piece of equipment/component came online (e.g., began to operate, etc.) and failure date corresponds to the date the piece of equipment/component experienced a failure (e.g., a component failure such as a broken cooling valve, etc.). In some embodiments, a plurality of runtimes may be determined for a chiller based on a plurality of failures within the chiller. For example, for a first chiller component failure, a first runtime equals a first failure date minus the start date as described above. For a second chiller component failure, a second runtime equals the first failure date minus a second failure date. Thus the function for calculating a runtime for chiller component after the first failure may be expressed as:

$$\text{runtime}_n = \text{failure date}_n - \text{failure date}_{n-1}$$

In various embodiments herein the runtime based on first failure is used, but it should be understood that runtimes for subsequent failures, or runtimes associated with multiple failures, may be utilized, and all such modifications are contemplated within the scope of the present disclosure. In various embodiments, data preparation circuit 614 may calibrate a runtime using climate data. For example, data preparation circuit 614 may retrieve climate data associated with a location a chiller is installed in and may update a runtime associated with the chiller based on the number of days the location was below a threshold temperature during the operating period of the chiller. It will be appreciated by those skilled in the art that the exact method for computing a runtime associated with equipment/components may vary depending on the type of equipment/components. In various embodiments, data preparation circuit 614 implements the function:

$$\text{runtime} = \text{failure date} - \text{state date} - \text{idle day}(s)$$

where idle day(s) corresponds to a number of days a piece of equipment/component was idle. In various embodiments, data preparation circuit 614 may determine idle day(s) based on climate data. For example, data preparation circuit 614 may perform a lookup using a table listing appropriate idle day(s) values by region (e.g., as stored in environmental models 608, etc.). Additionally or alternatively, data preparation circuit 614 may determine idle day(s) using operational data from one or more chillers. For example, data preparation circuit 614 may query a chiller to determine an amount of operating time (e.g., hours, days, etc.) associated with the chiller and may compute runtime and/or idle day(s) based on the operating time.

In some embodiments, data preparation circuit 614 removes infant mortality data from training data. For example, data preparation circuit 614 may remove entries in retrieved training data corresponding to chillers that have a runtime that is below a threshold (e.g., 100 days, etc.). In some embodiments, data preparation circuit 614 compares a runtime associated with a data entry to a threshold. Additionally or alternatively, data preparation circuit 614 may remove entries from training data corresponding to “stale” data (e.g., data recorded a long time ago, etc.). For example, data preparation circuit 614 may remove entries in retrieved training data corresponding to failures that occurred before 2010. In some embodiments, data preparation circuit 614 compares a date associated with an entry in the training data to a threshold to determine whether the entry should be trimmed. For example, data preparation circuit 614 may trim data that is older than 10 years to prevent data from outdated chiller models being used to train a model to generate reliability metrics for a modern chiller.

In some embodiments, data preparation circuit 614 merges data from multiple sources. For example, data preparation circuit 614 may retrieve failure dates associated with chillers from warranty claim data and may retrieve installation dates associated with the chillers from a manufacturing, shipping, and install database. As another example, data preparation circuit 614 may retrieve fault dates associated with an access control device (e.g., an electronic door lock, etc.) from a BMS and may retrieve an installation date associated with the access control device from a maintenance log. In various embodiments, merging multiple data sources may improve data quality, thereby improving the accuracy of models trained using the merged data. Additionally or alternatively, data preparation circuit 614 may analyze training data to identify and trim entries relating to failures that are not statistically significant. For example, data preparation circuit 614 may remove entries in retrieved training data corresponding to component failures that occur less than a threshold number of times (e.g., or represent a threshold proportion of the total population, etc.).

Trainer circuit 616 may train one or more models using training data prepared by data preparation circuit 614. For example, trainer circuit 616 may train a parametric model such as a Weibull model and/or a semi-parametric model such as a Cox model. In various embodiments, training a Weibull model may include determining a shape parameter and/or a scale parameter. For example, trainer circuit 616 may determine a Weibull distribution based on training data using the function:

$$R(t) = 1 - F(t) = e^{-\left(\frac{t}{\eta}\right)^{\beta}}$$

where R(t) is the reliability function at time t, F(t) is the probability of failure at time t, η is the Weibull scale parameter, and β is the Weibull shape parameter. In various embodiments, 0<β<1 corresponds to the infant mortality period, β=1 corresponds to the normal life period, and β>1 corresponds to the wear-out period. In some embodiments, trainer circuit 616 trains a machine learning model using a reliability metric from a Weibull model to optimize between a component survival probability, a monetary cost associated with a failure, an operational cost associated with a piece of equipment/component (e.g., from a chiller operating at sub-optimal capacity, etc.), and/or resource constraints. In various embodiments, trainer circuit 616 implements recursive learning by updating a model using feedback.

Reliability analysis circuit 618 may use one or more models trained by trainer circuit 616 to generate reliability metrics and/or maintenance recommendations. For example, reliability analysis circuit 618 may retrieve a shape and a scale parameter from a trained Weibull model and use the shape and scale parameter to determine a MTBF metric. As another example, reliability analysis circuit 618 may use a reliability measure associated with a point in time to determine an optimal maintenance plan based on the survival probability of a component at the point in time, a cost associated with a failure of the component, an operational cost of the component, and/or any resource constraints that may exist. In some embodiments, reliability analysis circuit 618 implements the function:

$$\min \sum_{t \in T} \left( \sum_{i \in I} \alpha_{it} P_{it} + \sum_{j \in J} \beta_j X_{jt} \right)$$

$$\text{s.t.} \sum_{j \in J} \beta_j X_{jt} \le \overline{\beta}_t,\ t \in T$$

$$\sum_{j \in J} \gamma_j X_{jt} \le \overline{\gamma}_t,\ t \in T$$

In some embodiments, reliability analysis circuit 618 implements the function:

$$f(t) = \frac{dF(t)}{dt} = \frac{\beta}{\eta^{\beta}} t^{\beta-1} e^{-\left(\frac{t}{\eta}\right)^{\beta}}$$

where $f(t)$ is the probability density function (PDF) of failure at time t. Additionally or alternatively, reliability analysis circuit 618 may implement the function:

$$h(t) = \frac{f(t)}{R(t)} = \frac{\beta}{\eta^{\beta}} t^{\beta-1}$$

where h(t) is the hazard rate function for the instantaneous conditional probability of failure at time t. In some embodiments, reliability analysis circuit 618 determines a MTBF as:

$$MTBF = \eta \Gamma\left(\frac{1}{\beta} + 1\right)$$

where Γ is:

$$\Gamma(z) = \int_0^{\infty} t^{z-1} e^{-t} dt,\ \Re(z) > 0$$

where z is a complex number. In some embodiments, reliability analysis circuit 618 determines time to X % failure as:

$$B(X) = \eta\left(-\log\left(1 - \frac{x}{100}\right)^{\frac{1}{\beta}}\right)$$

where X is a percentage failure (e.g., a likelihood of failure, etc.).

In various embodiments, reliability models 606 include a database storing one or more trained models generated by trainer circuit 616. For example, reliability models 606 may include a number of trained machine learning models (e.g., weights associated with nodes of a neural network, etc.) generated by trainer circuit 616. As another example, reliability models 606 may include a number of shape and scale parameters corresponding to different trained Weibull models. In some embodiments, different models are used for different pieces of equipment/components. For example, reliability models 606 may include a first model for generating reliability metrics associated with a first component (e.g., a cooling coil, etc.) and may include a second model for generating reliability metrics associated with a second component (e.g., a bracket, etc.). In various embodiments, reliability models 606 may include models associated with individual components, pieces of equipment (e.g., a chiller, an access control device, a security camera, a fire suppression device, etc.) and/or a cluster of equipment/components (e.g., all chillers produced from a certain manufacturing location, all chillers produced in a certain year, all building controllers having a specific firmware version, etc.).

Environmental models 608 may include a database storing climate data for calibrating runtimes associated with HVAC equipment. For example, environmental models 608 may include a table listing idle calibration offsets associated with various geographic regions to facilitate calibrating a runtime associated with a chiller. In various embodiments, environmental models 608 include historical data. For example, environmental models 608 may include a climate model including daily temperatures for an area over a five-year period. In some embodiments, predictive maintenance system 602 determines climate data based on operational data received from chillers 630. For example, predictive maintenance system 602 may receive control signals from chillers 630 indicating when chillers 630 are operating and/or contextual data (e.g., at what load chillers 630 are running, what an indoor temperature setpoint is, what the outdoor air temperature is, etc.) and may store the information in environmental models 608 based on the geography of chillers 630.

Knowledge base 620 may be a database storing data associated with HVAC equipment such as chillers. For example, knowledge base 620 may include warranty claim data describing (i) an equipment/component identifier, (ii) a ship date (e.g., a date a piece of equipment/component was shipped to an install location, etc.), (iii) a failure date (e.g., a date a piece of equipment/component failed, etc.), (iv) a runtime associated with the equipment/component (e.g., runtime may be equal to the subtraction of the start date from the failure date), (v) a start date (e.g., a date the piece of equipment/component began operating at the install location, etc.), (vi) a manufacturing location identifier, (vii) a product description, and/or (viii) a location identifier associated with the install location (e.g., an address, etc.). In some embodiments, knowledge base 620 includes service history data (e.g., a record of maintenance performed on a piece of equipment/component, etc.). It should be understood that while knowledge base 620 is described in relation to including warranty claim data, knowledge base 620 may store any data from which a runtime associated with a piece of equipment/component may be calculated and that the present disclosure is not limited to computations based on warranty claim data. For example, knowledge base 620 may include fault data associated with a number of building devices (e.g., lighting controllers, thermostats, access control devices, etc.). In various embodiments, knowledge base 620 is or includes a digital twin database such as a knowledge graph. For example, knowledge base 620 may include a graph data structure having nodes representing building devices and/or building device components and edges connecting the nodes representing relationships between the building devices and/or building device components.

Chillers 630 may be one or multiple chillers, e.g., chiller 102 as described with reference to FIG. 1. Chiller sensors 632 can be positioned on, within, and/or adjacent to chillers 630, according to some embodiments. Further, chiller sensors 632 can be configured to collect a variety of data including usage time, efficiency metrics, input and output quantities, as well as other data. According to some embodiments, chiller sensors 632 can be configured to store and/or communicate collected chiller data. In some embodiments, chillers 630 can also be configured to store and/or communicate collected chiller data from chiller sensors 632. Predictive maintenance system 602 may receive performance data from chillers 630 and generate equipment/component reliability models for the chillers and utilize the models to determine the likelihood of a failure occurring in the future for chillers 630. Predictive maintenance system 602 may not be limited to performing failure predictions for chillers and can also be configured to perform failure prediction for other types of building equipment (e.g., air handler unit 106 as described with reference to FIG. 1, boiler 104 as described with reference to FIG. 1, etc.).

External systems 640 may communicate with predictive maintenance system 602. For example, external systems 640 may include client devices (e.g., such as client devices 448, etc.) used by building maintenance personnel and may receive maintenance recommendations from predictive maintenance system 602. As another example, external systems 640 may include a weather reporting system which may communicate historical climate data to predictive maintenance system 602 to facilitate calibrating runtime estimates associated with chillers. As yet another example, external systems 640 may include building controllers (e.g., BMS controller 366, etc.) and/or remote systems such as a work order management system (e.g., remote systems and applications 444, etc.) that receive reliability metrics and/or work order requests from predictive maintenance system 602 to facilitate automated work order requests and/or part ordering.

Figure 7:
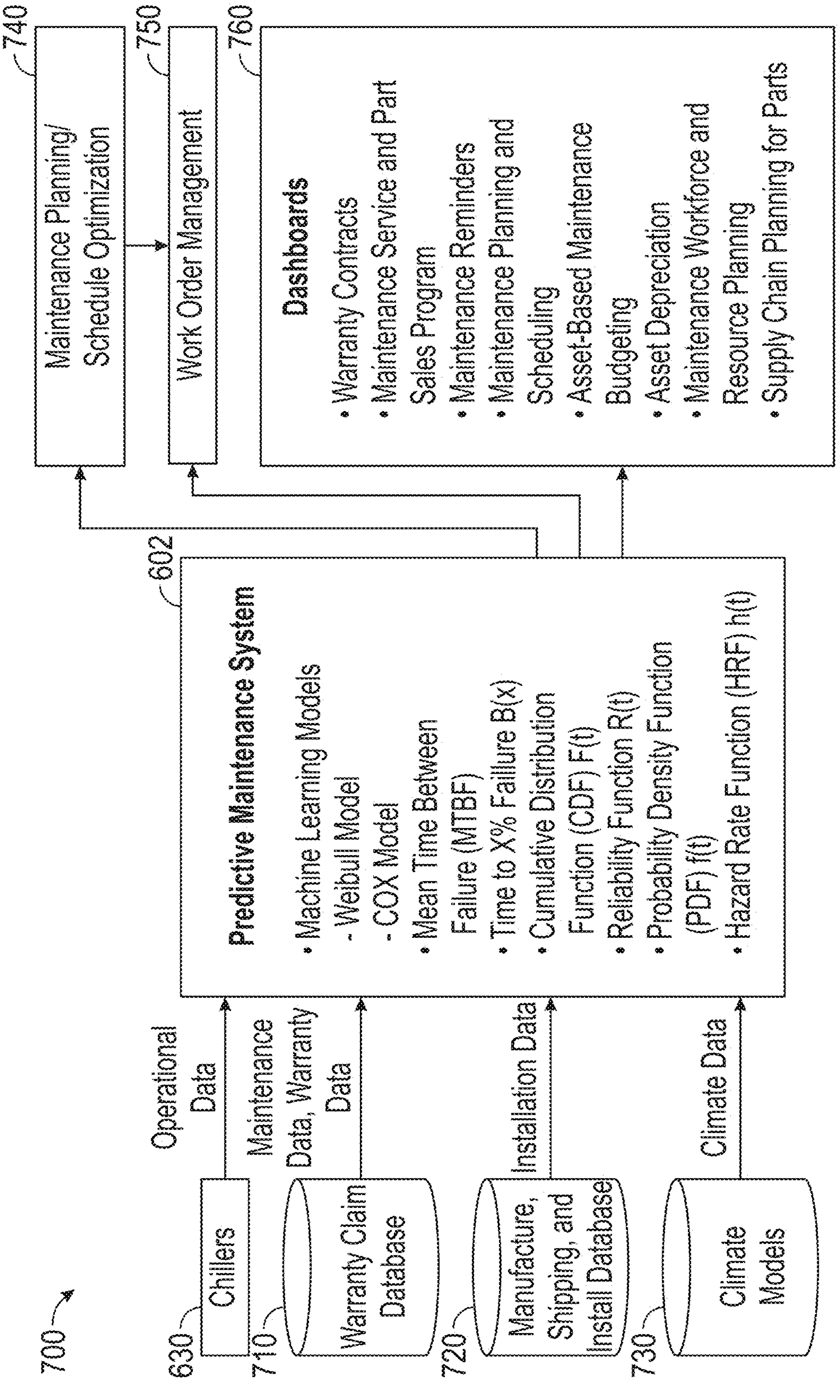
FIG. 7 is a block diagram illustrating interactions of the predictive maintenance system of FIG. 6 with external systems, according to some embodiments.
Figure 8C:
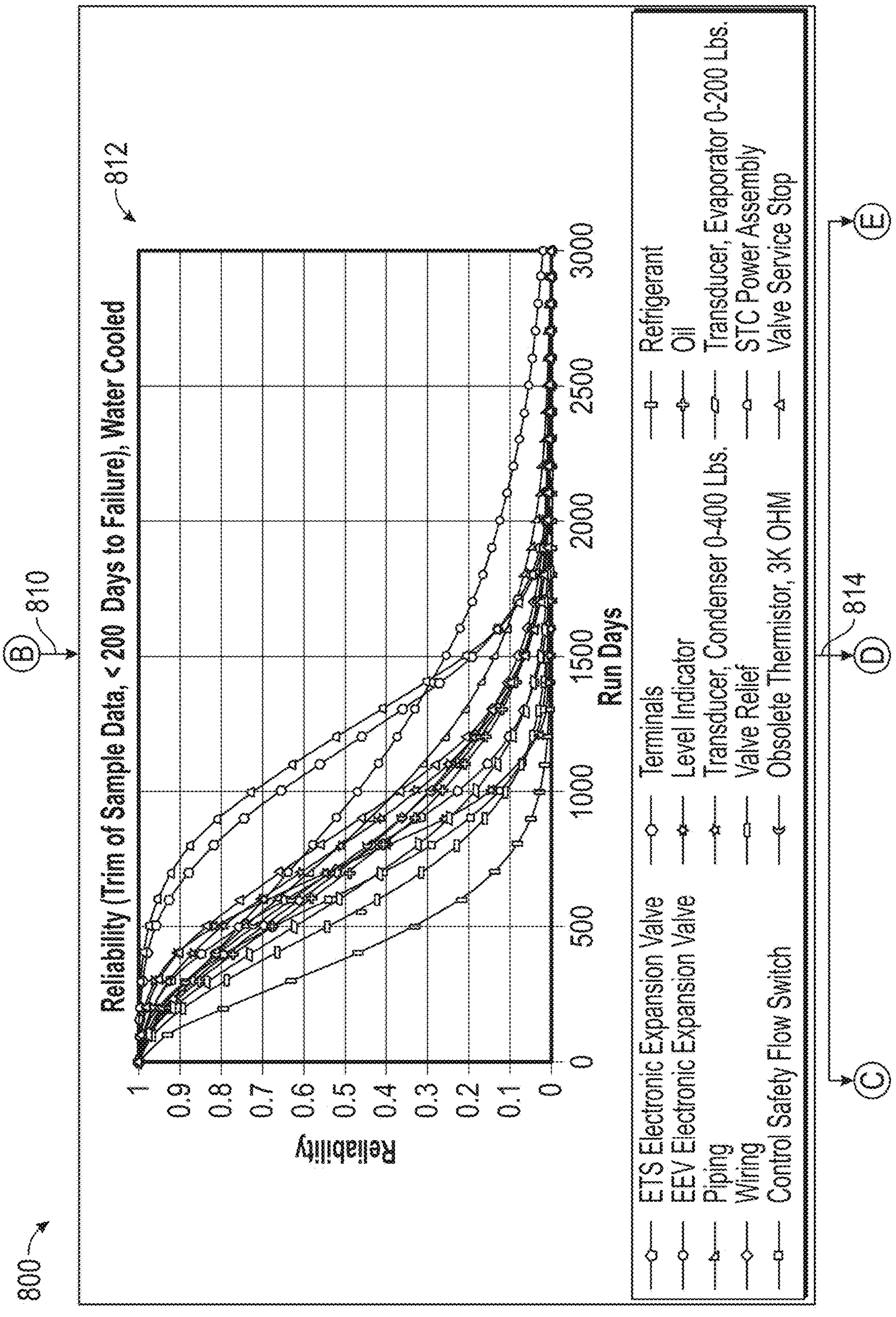
Figure 8D:
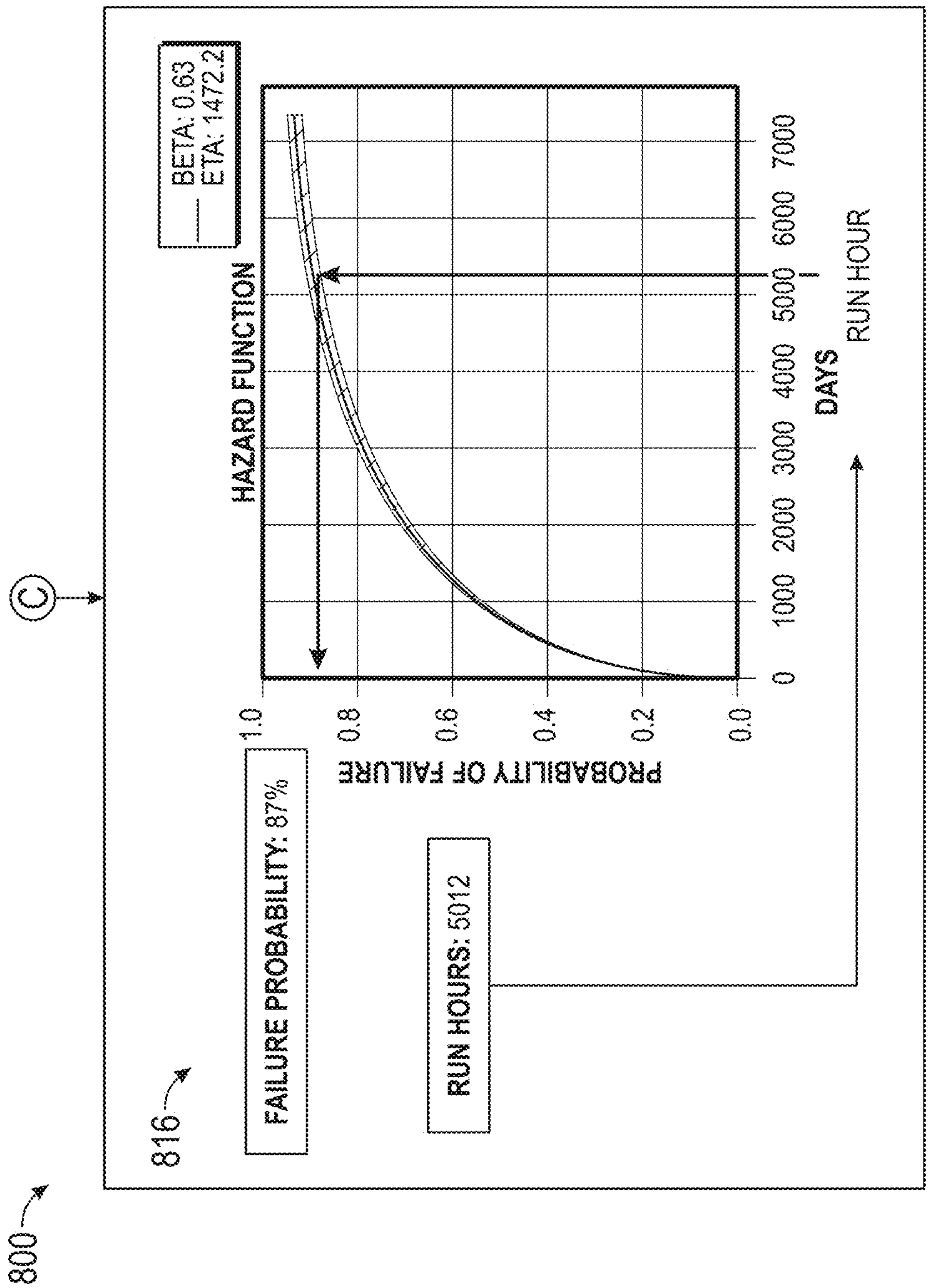
Figure 8F:
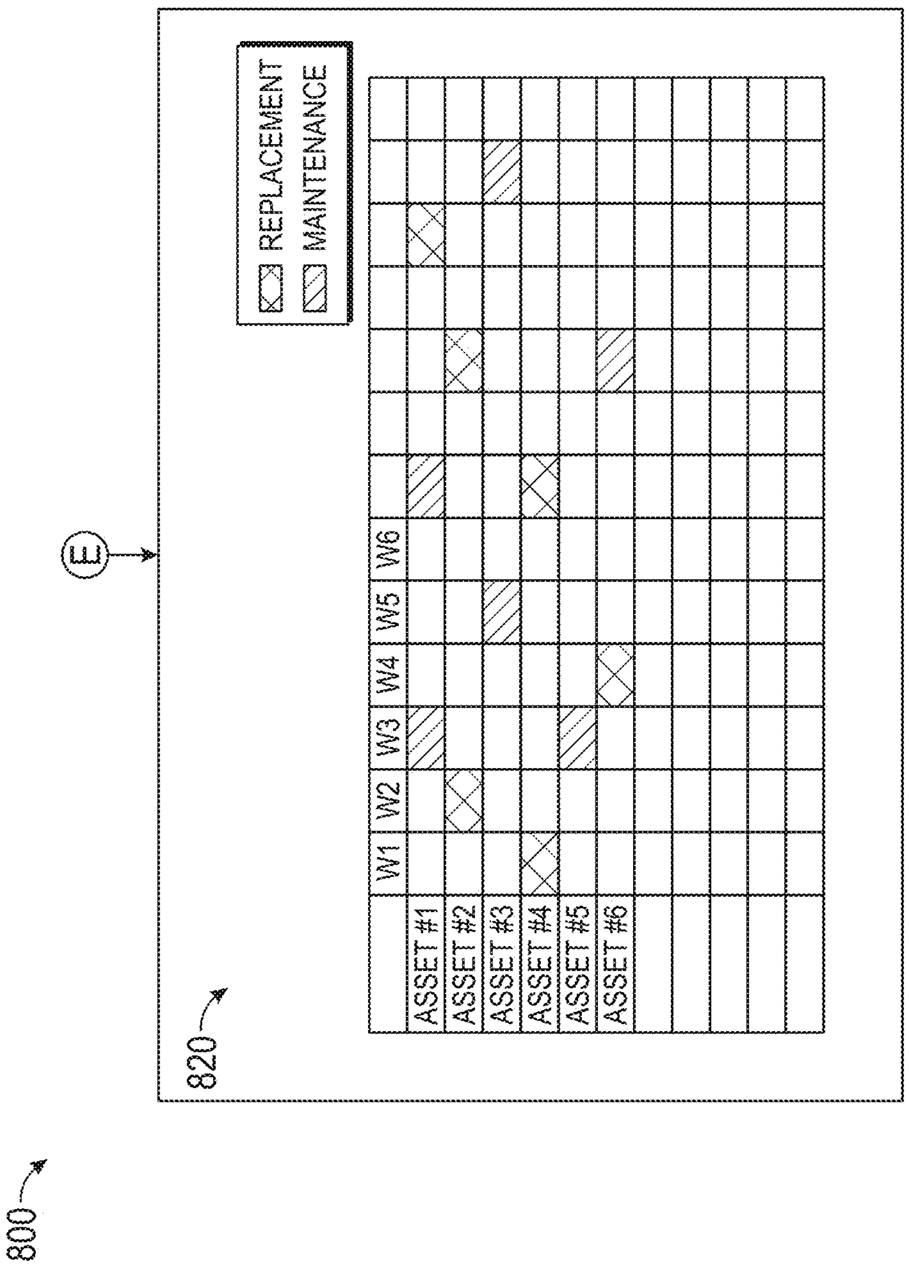

Referring now to FIG. 7, interactions between predictive maintenance system 602 and external systems is shown, according to an exemplary embodiment. In various embodiments, predictive maintenance system 602 receives external data. For example, predictive maintenance system 602 may receive operational data from chillers, maintenance data (e.g., as included in warranty claim data, etc.) from a warranty claim database, installation data from a manufacturing, shipping, and installation database, climate data from climate models, fault data from a BMS, predictive maintenance data from a BMS, and/or the like.

In various embodiments, predictive maintenance system 602 trains a machine learning and/or statistical model using the received data to generate a trained model. In some embodiments, the trained model includes a Weibull model. For example, training a Weibull model may include determining a Weibull shape and scale parameter based on historical equipment/component failure data and/or runtimes determined therefrom. Additionally or alternatively, the trained model may include a Cox model. In various embodiments, predictive maintenance system 602 generates reliability metrics based on the trained models. For example, predictive maintenance system 602 may generate a MTBF metric, a time to X % failure metric, a cumulative distribution function (CDF), a reliability function, a probability distribution function (PDF), a hazard rate function (HRF), and/or other statistical measures.

In various embodiments, predictive maintenance system 602 transmits data to external systems. For example, predictive maintenance system 602 may transmit reliability metrics generated by the trained models to external systems. The external systems may include a maintenance planning/schedule optimization system, a work order management system, and/or the like. In some embodiments, predictive maintenance system 602 generates one or more graphical user interfaces (GUIs). For example, predictive maintenance system 602 may publish results generated by the trained models to one or more dashboards. In various embodiments, the dashboards may inform warranty contracts, maintenance service and part sales programs, maintenance reminders, maintenance planning and scheduling, asset-based maintenance budgeting, asset depreciation, maintenance workforce and resource planning, and/or supply chain planning for parts, to name a few non-limiting examples.

Turning now to FIGS. 8A-8F, a flow diagram illustrating method 800 for data manipulation for preparing data for training a reliability model is shown, according to an exemplary embodiment. In various embodiments, method 800 is performed by predictive maintenance system 602. For example, predictive maintenance system 602 may receive historical installation, maintenance, and operation data from external systems and may perform method 800 to prepare the received data for training a machine learning model to generate reliability metrics.

At step 802, predictive maintenance system 602 may retrieve data from which a runtime associated with building devices/building device components (e.g., chillers and/or chiller components, etc.) can be determined. For example, predictive maintenance system 602 may retrieve warranty claim data describing an installation date and failure date associated with a number of chillers/chiller components. As another example, predictive maintenance system 602 may retrieve fault data describing one or more faults associated with a building device (e.g., an access control device, etc.). As shown, the retrieved data includes (i) a product part description, (ii) a ship date associated with when a product was shipped to a customer, (iii) a failure date associated with when a product experienced a failure (e.g., broke, etc.), (iv) a component description, (v) a start date associated with when a product came online (e.g., began to operate at a customer location, etc.), (vi) a manufacture site, (vii) a product identifier, and (viii) a location (e.g., an install location of the product, an address, etc.). In various embodiments, predictive maintenance system 602 may calculate a runtime for the product based on the start date and the failure date. In various embodiments, the retrieved data may include records associated with chillers/chiller components that never experienced a failure. In various embodiments, predictive maintenance system 602 may calculate a runtime for chillers/chiller components that never experienced a failure using a current date (e.g., runtime=current date−install date, etc.). In various embodiments, predictive maintenance system 602 retrieves data for performing anomaly detection from a digital twin database, such as a knowledge graph. For example, predictive maintenance system 602 may retrieve the data from a building equipment object and/or from an object connected to the building equipment object by a relationship edge. Digital twins and knowledge graphs are discussed in greater detail in U.S. patent application Ser. No. 17/134,659, filed on Dec. 28, 2020, the entire disclosure of which is incorporated by reference herein.

At step 804, predictive maintenance system 602 may calibrate one or more runtimes generated based on the received data to produce calibrated data 808. For example, predictive maintenance system 602 may adjust runtimes using climate data 806. In various embodiments, step 804 includes querying a lookup table using a location associated with a building device/building device component (e.g., chiller/chiller component, etc.) to identify an idle adjustment to apply to a runtime associated with a building device/building device component (e.g., chiller/chiller component, BMS device, etc.). For example, predictive maintenance system 602 may identify a runtime and a location associated with a chiller/chiller component, may determine an idle offset to apply to the chiller/chiller component based on climate data 806 associated with the location, and may adjust the runtime based on the idle offset to produce a calibrated runtime for the chiller/chiller component. As another example, predictive maintenance system 602 may identify a runtime and a location associated with an access control device, may determine an idle offset to apply to the access control device based on fault data associated with the access control device, and may adjust the runtime based on the idle offset to produce a calibrated runtime for the access control device.

Additionally or alternatively, step 804 may include trimming the received data. For example, predictive maintenance system 602 may trim the received data to remove records based on (i) a lifetime threshold, (ii) a date threshold, and/or (iii) a threshold number of failures. The lifetime threshold may correspond to a threshold amount of runtime. For example, predictive maintenance system 602 may remove records associated with chillers/chiller components that have an associated runtime that is less than a threshold number of days (e.g., 100 days, etc.). In some embodiments, the lifetime threshold is determined dynamically. For example, predictive maintenance system 602 may perform a lookup to determine a custom lifetime threshold for each building device/building device component (e.g., chiller/chiller component, etc.). In various embodiments, trimming the received data according to the lifetime threshold facilitates removing infant mortality data, thereby increasing an accuracy of a resulting model trained using the trimmed data.

The date threshold may correspond to a threshold date associated with the records. For example, predictive maintenance system 602 may remove records associated with chillers/chiller components installed before the year 2010. In some embodiments, step 804 includes analyzing metadata associated with the received data to determine a date (e.g., a year, etc.) that the data was recorded. In some embodiments, the date threshold is determined dynamically. For example, predictive maintenance system 602 may determine the date threshold based on a data quality review that determines that data recorded during a particular time period (e.g., May 2001 to June 2003, etc.) is unreliable.

The threshold number of failures may correspond to a minimum number of chiller/chiller component failures required to be statistically significant. For example, predictive maintenance system 602 may analyze the received data and determine the number of failures associated with a particular component and may compare the number of failures to a threshold to determine whether the failures associated with the particular component are statistically significant. As another example, predictive maintenance system 602 may analyze the received data to determine a rate of a particular type of failure associated with a particular chiller component, may compare the rate to a threshold rate associated with the particular type of failure and the particular chiller component, and may trim the received data based on the comparison. In some embodiments, predictive maintenance system 602 determines the threshold dynamically. For example, predictive maintenance system 602 may determine the threshold based on a sample size (e.g., the total number of components in circulation, the number of components for which there are records available, etc.).

At step 810, predictive maintenance system 602 may train one or more machine learning and/or statistical models using the calibrated and/or trimmed data. In various embodiments, step 810 includes determining a Weibull shape and/or scale parameter using calibrated data 808. In some embodiments, step 810 includes generating a Weibull distribution. Additionally or alternatively, step 810 may include generating one or more statistical measures associated with a Weibull distribution. For example, step 810 may include generating a mean, median, standard deviation, and variance associated with a Weibull scale parameter. In various embodiments, predictive maintenance system 602 may generate a Weibull distribution for each chiller/chiller component included in the received data. In various embodiments, the result of step 810 is model 812.

At step 814, predictive maintenance system 602 may generate results based on the trained machine learning and/or statistical models (e.g., model 812, etc.). For example, predictive maintenance system 602 may generate failure probability distribution 816 for a chiller component. As another example, predictive maintenance system 602 may generate table 818 summarizing a failure probability and a MTBF metric for a number of chiller components at a customer location. Table 818 includes a number of predicted failures associated with equipment/components installed at customer locations. In various embodiments, table 818 includes a listing of runtimes associated with various components. Additionally or alternatively, table 818 may include a failure probability and/or a MTBF associated with the various components. As yet another example, predictive maintenance system 602 may generate GUI 820 including maintenance and replacement recommendations for various pieces of equipment/components. In some embodiments, predictive maintenance system 602 exports/stores results in electronic storage (e.g., a database, etc.). For example, predictive maintenance system 602 may store the results into a digital twin database, such as a knowledge graph (e.g., in a building equipment object, in a relationship edge, etc.).

Figure 9A:
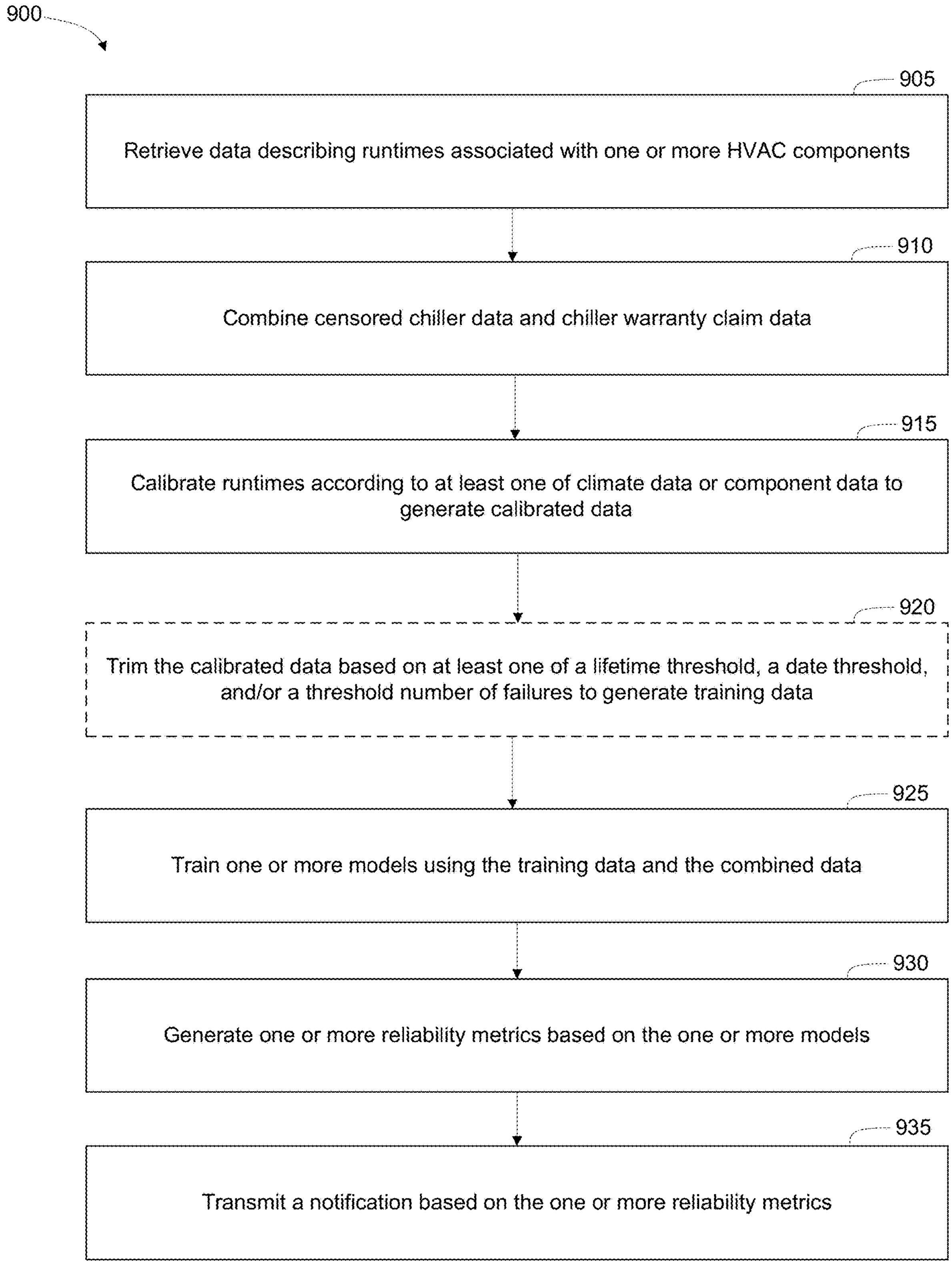
FIG. 9A is a flow diagram illustrating a method of generating one or more reliability metrics, according to some embodiments.

Turning now to FIG. 9A, a flow diagram illustrating method 900 for generating one or more reliability metrics is shown, according to an exemplary embodiment. In various embodiments, predictive maintenance system 602 performs method 900. At step 905, predictive maintenance system 602 may retrieve data describing runtimes associated with one or more HVAC components. For example, predictive maintenance system 602 may retrieve data including a date a chiller started operation and a date the chiller experienced a failure and stopped operation. As another example, the predictive maintenance system 602 may retrieve censored chiller data and chiller warranty claim data. In some embodiments, step 905 includes retrieving data from a number of sources. For example, predictive maintenance system 602 may retrieve a first dataset (e.g., chiller warranty claim data) from a warranty claims database and may retrieve a second dataset from a maintenance and repair database. In various embodiments, the one or more HVAC components include chillers and/or chiller components (e.g., cooling coils, etc.). In some embodiments, step 905 includes calculating a runtime using the retrieved data. For example, the retrieved data may include information such as a start date and a failure date and predictive maintenance system 602 may calculate a runtime based on the start date and the failure date. At step 910, predictive maintenance system 602 may combine censored chiller data and chiller warranty data to create a dataset that is robust to against a high false alarm failure rate as described above.

At step 915, predictive maintenance system 602 may calibrate the runtimes according to at least one of climate data or component data to generate calibrated data. For example, predictive maintenance system 602 may reduce a runtime associated with a chiller component using an idle offset associated with a geographic region the chiller component is installed in. In various embodiments, step 915 includes identifying a geographic location identifier associated with a record entry such as a street address, performing a lookup using the geographic location identifier to determine an idle offset associated with the geographic location identifier, and adjusting a runtime associated with the record entry based on the determined idle offset.

In various embodiments, predictive maintenance system 602 retrieves climate data and/or component data from external sources. For example, predictive maintenance system 602 may query a climate model to retrieve a temperature profile including timeseries temperature data associated with a geographic region. The component data may include service data, an installation date, a manufacture date, and/or the like. In various embodiments, step 915 includes updating a runtime based on an approximated start date. For example, the retrieved data may omit a start date used to calculate a runtime and step 915 may include approximating a start date using an installation date and/or a manufacture date and calculating a runtime based on the approximated start date.

At step 920, predictive maintenance system 602 may trim the calibrated data based on at least one of a lifetime threshold, a date threshold, and/or a threshold number of failures to generate training data. In various embodiments, step 920 includes removing infant mortality data, stale data (e.g., data recorded before a threshold date, etc.), and/or statistically insignificant data. In various embodiments, step 920 is optional.

At step 925, predictive maintenance system 602 may train one or more models using the training data. For example, predictive maintenance system 602 may train a parametric model such as a Weibull model for each component of a chiller. As another example, predictive maintenance system 602 may train a semi-parametric model such as a Cox model for a cluster of chillers manufactured at a particular location during a particular time period. Training the one or more models may include generating a Weibull distribution using the training data. In some embodiments, method 900 may include recursive training (e.g., step 942, etc.). In some embodiments, an indicator of whether combined data (e.g., censored data plus warranty claim data) or only uncensored data is being used may be provided to the model as in input so that the model may adjust based on the data used. For example, if combined data is being used, a one may be used as an input into the model. If only uncensored data is being used, a zero may be used as an input to the model.

At step 930, predictive maintenance system 602 may generate one or more reliability metrics based on the one or more models. In various embodiments, step 930 includes determining a Weibull shape and/or scale parameter based on a Weibull distribution.

Additionally or alternatively, predictive maintenance system 602 may calculate additional reliability descriptions such as a MTBF, time to X % failure, CDF, reliability function, PDF, and/or HRF.

At step 935, predictive maintenance system 602 may transmit a notification based on the one or more reliability metrics. For example, predictive maintenance system 602 may generate and transmit a maintenance recommendation (e.g., a recommendation to replace a particular component based on a high likelihood that the component will fail imminently, etc.).

As another example, predictive maintenance system 602 may automatically generate and transmit a work order request. As yet another example, predictive maintenance system 602 may generate and display a GUI including a dashboard illustrating estimated lifetimes associated with various chiller components at a location.

Figure 11:
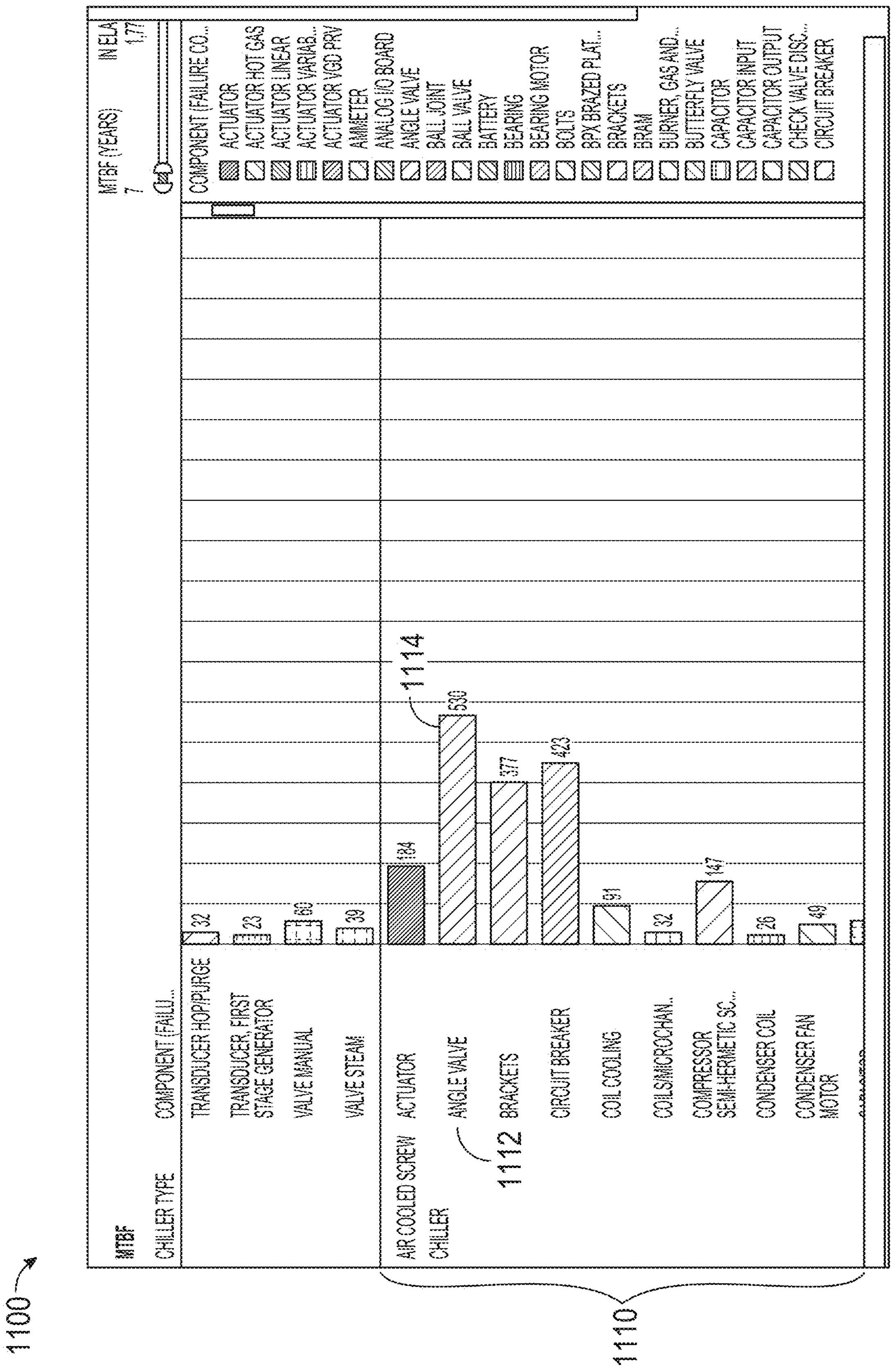
FIG. 11 is a user interface illustrating a number of reliability metrics, according to some embodiments.
Figure 12:
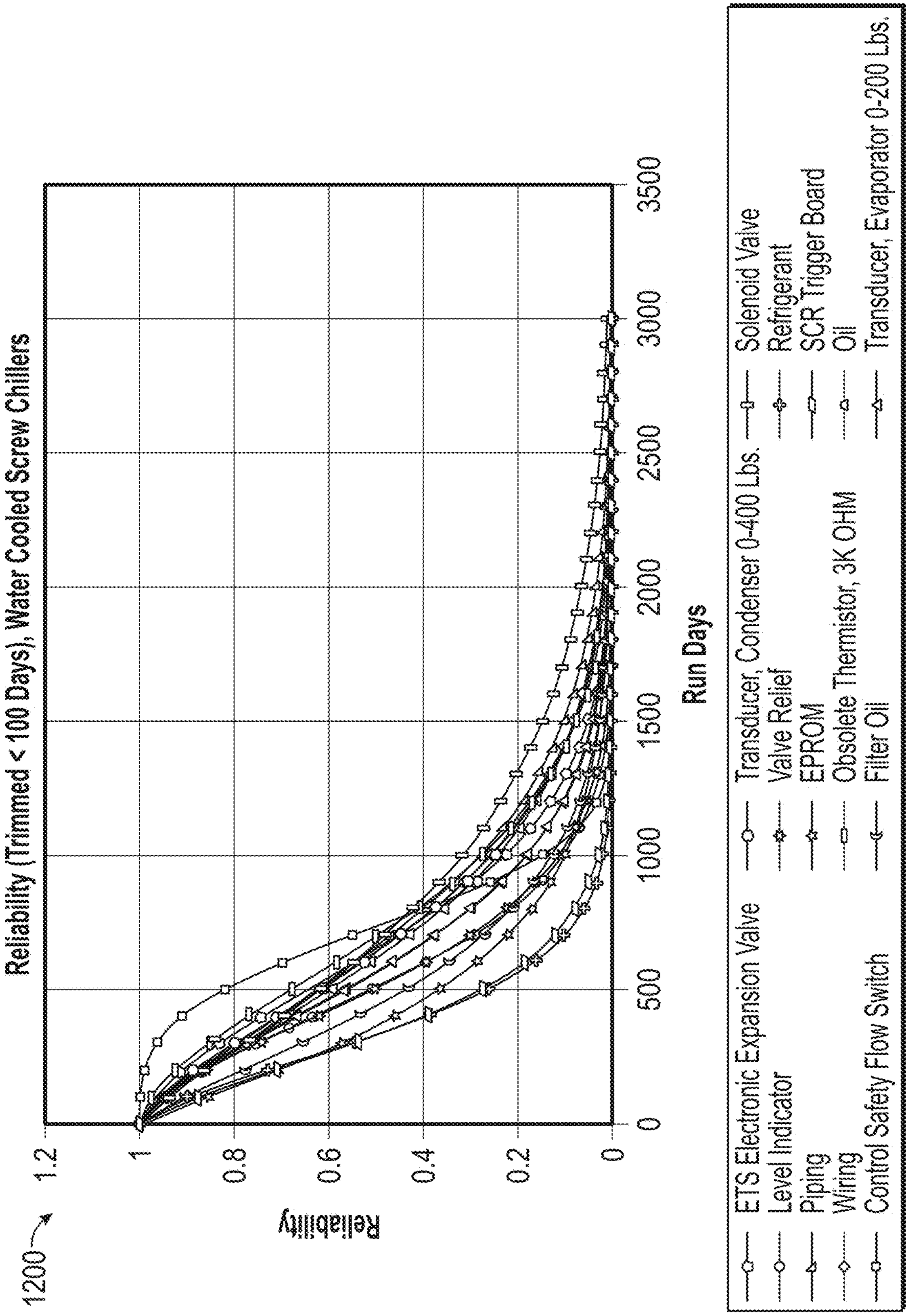
FIG. 12 is graph illustrating a reliability metric for a number of HVAC components, according to some embodiments.

Referring now to FIGS. 10-12, various results generated by predictive maintenance system 602 are shown, according to various embodiments. In various embodiments, predictive maintenance system 602 displays one or more of the interfaces associated with FIGS. 10-12. FIG. 10 illustrates table 1000 including a number of reliability metrics such as a time to 10% life (e.g., "B(10) Life"), a reliability percentage at 1 year (e.g., the probability a component will still be fully functional at one year, etc.), and a current reliability (e.g., "Reliability (t)"). In various embodiments, table 1000 includes reliability metrics specific to particular components of particular chiller models. Additionally or alternatively, table 1000 may include aggregate reliability metrics for entire chillers and/or chiller clusters.

Figure 9B:
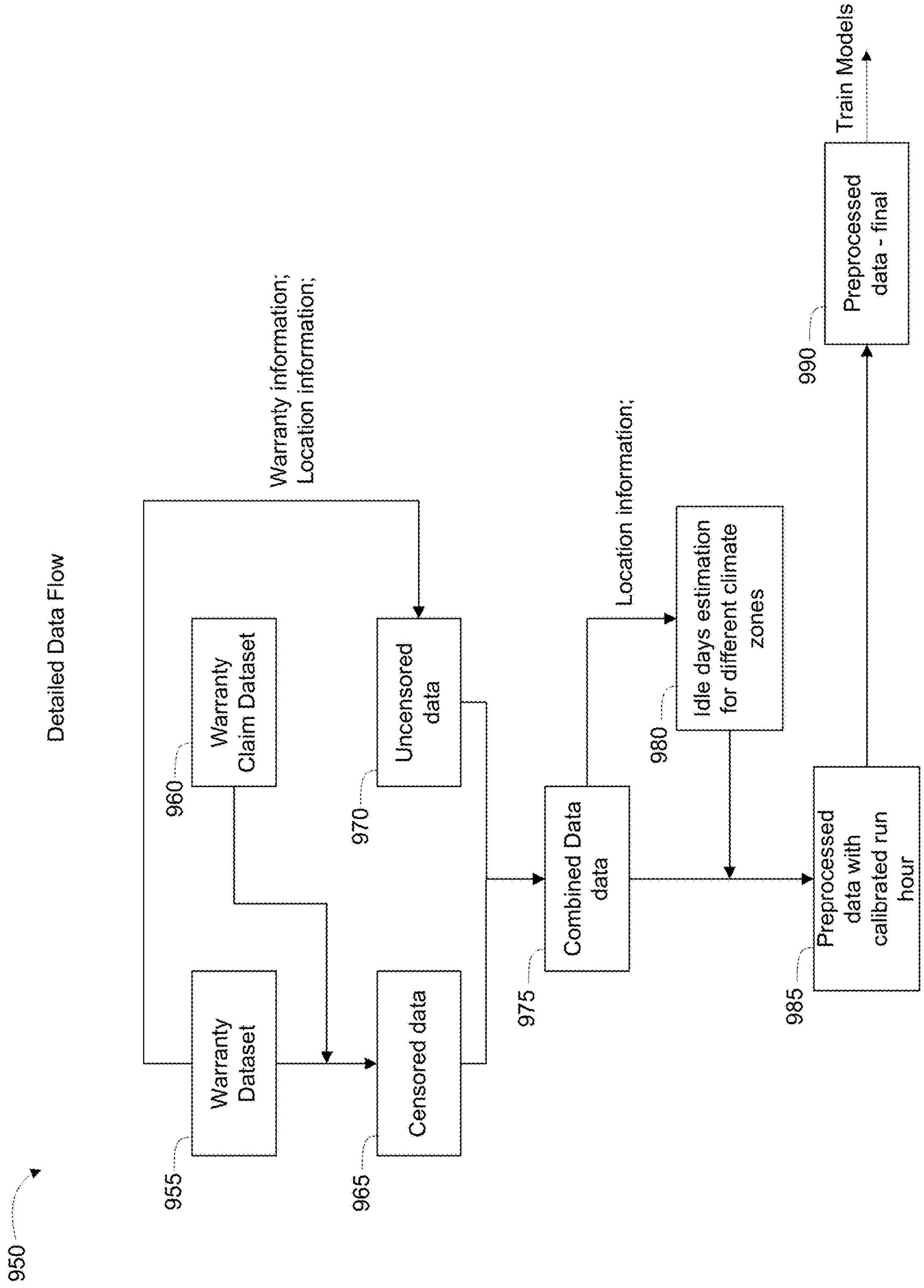
FIG. 9B is a flow diagram illustrating a data flow process for generating one or more datasets used to train the HVAC component reliability model of FIG. 6, according to some embodiments.

Turning now to FIG. 9B, a flow diagram illustrating a data flow process 950 for generating one or more datasets used to train the model is shown according to an exemplary embodiment. In various embodiments, predictive maintenance system 602 performs data flow process 950. The data flow process 950 may begin with two datasets: the warranty dataset 955 and the warranty claim dataset 960. Warranty dataset 955 may contain warranty information for chillers including but not limited to start date of the warranty, end date of the extended warranty, chiller identification information, and chiller location. Warranty claim dataset 960 contains chiller failure information including but not limited to failed chiller identification information, which component of the chiller failed, date of failure, resolution of warranty claim, and any other comments about the failure of the chiller. Warranty dataset 955 and warranty claim dataset 960 may be combined to create censored data 965. More specifically the chillers identified from the warranty claim dataset 960 may be subtracted from the warranty dataset 955 to determine censored data 965. Warranty dataset 955 and warranty claim data set 960 may also be used to determine uncensored data 970. Uncensored data 970 may be defined as chillers that have failed. In some embodiments, the uncensored data may include warranty information and location information for failed chillers. The censored data 965 and the uncensored data 970 may be combined to create the combined data 975 as discussed above. Combined data 975 and the location information of the chillers may be used to determine the idle days estimation for different climate zones data 980 as described in step 915 above. The combined data 975 and idle days estimation for different climate zones 980 may be used to create the preprocessed data with calibrated run hour 985 as described in step 915 above. The preprocessed data with calibrated run hour 985 may then be filtered as described in step 920 above to create the final data 990 that may be used to train the model as described above.

FIG. 11 illustrates GUI 1100 including a number of MTBF metrics associated with various chiller components. In various embodiments, predictive maintenance system 602 generates GUI 1100 based on one or more models trained using historical chiller information. For example, predictive maintenance system 602 may generate a Weibull distribution using historical runtimes associated with chillers and may generate GUI 1100 using the Weibull distribution. In various embodiments, GUI 1100 is color-coded based on the chiller component. For example, an actuator component may be colored red while an angle valve component may be colored green. GUI 1100 may include a number of chillers 1110 each having a number of components 1112. In various embodiments, predictive maintenance system 602 generates MTBF metric 1114 for each of components 1112.

FIG. 12 illustrates graph 1200 including a number of reliability functions associated with various chiller components plotted over time. The reliability functions may describe a likelihood a chiller component is to fail at a particular point in time based on historical failures associated with the chiller components. Graph 1200 is shown to relate to a particular type of chiller (e.g., a water cooled screw chiller). However, it should be understood that similar graphs may be generated for different chiller types, components thereof, and/or chiller clusters. In various embodiments, predictive maintenance system 602 removed data related to chillers that had a runtime of less than 100 days prior to generating graph 1200 as described in detail above.

Automated Maintenance Activities Using Reliability Models

Figure 13:
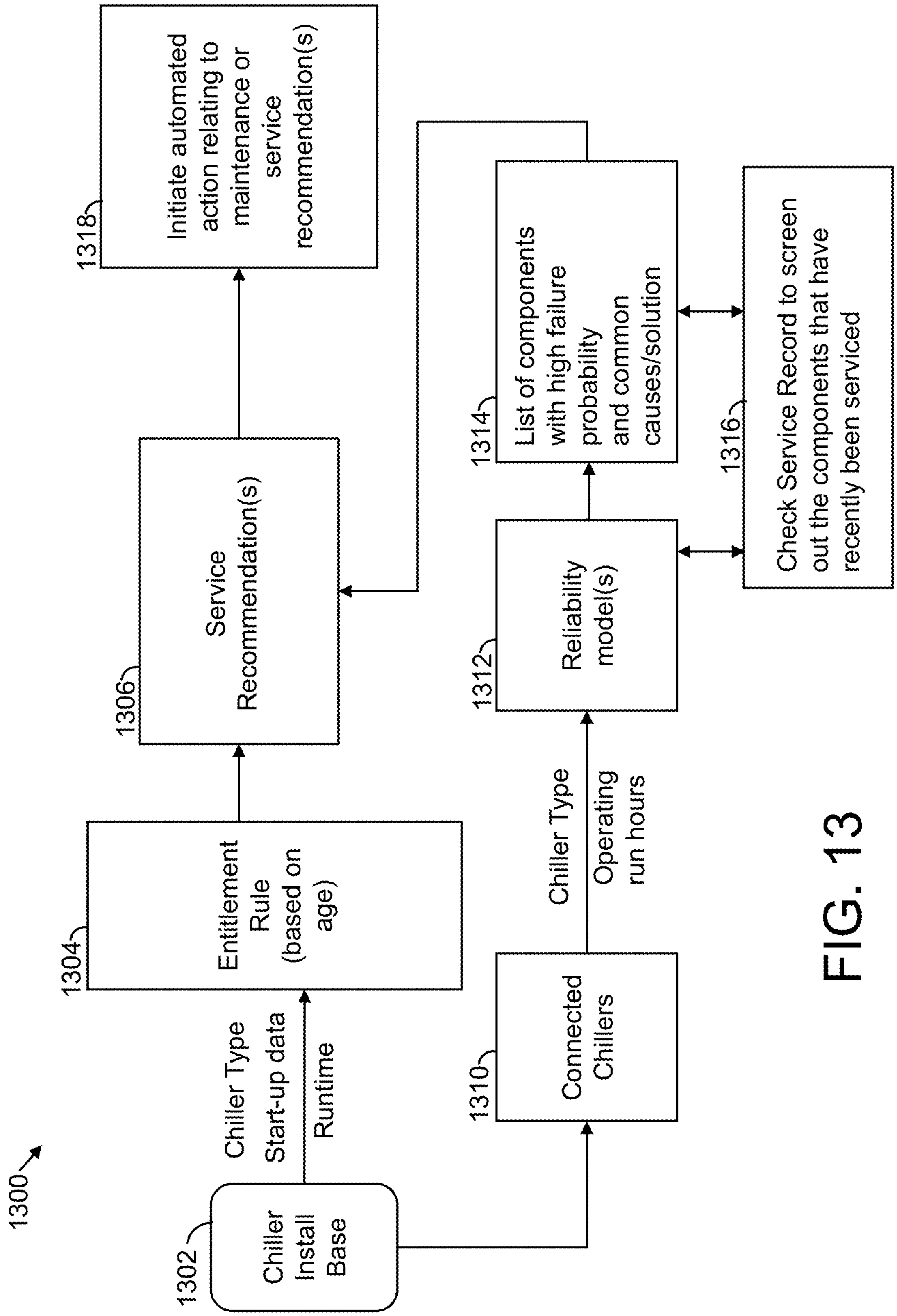
FIG. 13 is a flow diagram illustrating a process of using reliability modeling, according to some embodiments.

Referring now to FIG. 13, a flowchart of a process 1300 relating to modeling failure probabilities and initiating an automated action relating to maintenance or service recommendations is shown, according to some embodiments. The process 1300 can be executed by the various systems, circuitry, controllers, BMS components, etc. disclosed above, for example by the system 600 including the predictive maintenance system 602 of FIG. 6, in various embodiments. Process 1300 can be executed by one or more processors executing instructions stored on one or more non-transitory media causing the one or more processors to perform the operations of process 1300. The description below refer to chillers in some embodiments, with the present disclosure extending to embodiments which involve any type of equipment (e.g., other building equipment such as furnaces, boilers, air handling units, variable refrigerant flow systems, central plant equipment, etc.).

Process 1300 is shown as starting from block 1302 which corresponds to information provided relating to a chiller install base, i.e., to a collection of chillers (or other equipment). The information at block 1302 can include start-up data for each chiller (e.g., a date of installation or first use), a chiller type (e.g., model number, SKU, etc.), and monthly run information (e.g., indicating months where the chiller may be in use such as summer months based on different climates). The information from the chiller install base at block 1302 may not be based on, in some embodiments, real time data from equipment or other sources over time, but can be widely available for various equipment.

The information from the chiller install base block 1302 is shown as being provided to block 1304 where an entitlement rule is applied to the information based on age. Block 1304 can include executing logic to determine, based on the start-up data, monthly run data, and chiller type, whether the equipment is due for any particular services or maintenance. Block 1304 can be an implementation of static rules, preset schedule of services to provide, etc., based on age of the subsystem or component (e.g., to replace an oil filter after a certain number of years, replace a unit of equipment after a certain number of years). Block 1304 may apply a rules-based (e.g., if-then) programming approach to determine a set of service or maintenance recommendations. In some embodiments, such rules have yearly (annual) resolution (e.g., replacing a subsystem or component of a first type every 5 years, replacing a subsystem or component of a second type every 10 years, etc.).

Block 1304 can thus output a service recommendation shows as block 1306. Block 1306 indicates a service recommendation determined from the entitlement rule-based approach of block 1304 as applied to data from the chiller install base 1302. The service recommendation may be to replace an equipment unit, perform a particular maintenance task on the equipment, replace a component or subsystem of the equipment unit, change a control setting for the equipment unit, etc.

Process 1300 is also shown as including block 1310 representing that the chiller install base 1302 includes connected chillers (or other connected equipment). Connected equipment at block 1310 is shown as providing chiller type (e.g., self-identified model number, etc.) and operating run hours to block 1312. The connected equipment can include onboard processing circuitry configured to collect data relating to when and how much the connected equipment is running and output such data, for example to the predictive maintenance system 602.

At block 1312, one or more reliability models receive the chiller type and operating run hours data from the connected chillers 1310. The reliability model(s) may include machine learning or statistical model(s), for example a Weibull model as described elsewhere herein. Block 1312 can use the operating run hours data, for example by calculating a total runtime (since original start-up) for each unit of connected equipment (e.g., each connected chiller) and using such total runtime as input to the reliability model(s). The reliability model(s) may be configured to output probabilities of component failure based on such inputs. Each probability may quantify the chance that a particular component may fail in an upcoming time period (e.g., in the next week, in the next month, in the next year).

At block 1314, the probabilities from the reliability models of block 1312 are used to provide a list of components with high failure probability and, in some embodiments, with common causes or solutions. For example, the list may indicate a subset of components of the connected equipment for which the reliability models indicate probabilities of failure exceeding a threshold value. The list may group listed components together if those items are associated with a common cause or solution, for example if the same maintenance task would resolve (reduce, mitigate, eliminate, etc.) the associated risk. Such a list can be presented to a user via a graphical user interface, for example.

Process shows that block 1312 and 1314 can be influenced by block 1316, where a service record is checked to screen out components that were recently serviced (e.g., within a certain amount of time) or otherwise adjust inputs to the model based on previous service activities. Because the reliability models are based primarily on equipment runtime, previous service events will reset runtime to zero for associated components. Such updates can be accounted for in blocks 1312 and 1314 to avoid recommending service for components that were recently serviced or erroneously noting a high probability of failure for a recently serviced component.

Process 1300 further illustrates that the components and/or causes/solutions identified in block 1314 can be combined, used together, synergized, etc. with to provide the service recommendations in block 1306, which then culminates in initiation of an automated action relating to one or more maintenance or service recommendations at block 1318. In some embodiments, block 1306 includes generating a first service recommendation based on the entitlement rule(s) from block 1304 and a second service recommendation based on the list of components with high failure probability from block 1314, which are then combined to provide an combined recommendation and/or provide an automated action in block 1318 based on some combination of the first service recommendation and the second service recommendation. In some embodiments, both service recommendations from step 1306 based on the entitlement rule(s) in block 1304 and solutions to high-failure probabilities based on block 1314 are implemented in block 1318 (e.g., treated equally by block 1306 and/or 1318). In other embodiments, solutions to high-failure probabilities from block 1314 are prioritized over service recommendations from entitlement rules by block 1306 and/or block 1318 due to the higher granularity and other advantages of the approach shown by blocks 1310-1316. Other combinations, etc. can be used to get to block 1318. The automated actions initiated in block 1318 can include, for example, automatically implementing operational changes and/or maintenance tasks, for example using operations described as being performed in response to a predicted fault in U.S. patent application Ser. No. 17/710,443, field Mar. 31, 2022, the entire disclosure of which is incorporated by reference herein (see, e.g., FIG. 8 thereof). In some embodiments, automated actions include one or more of changing a control setting or control logic for the equipment such that the equipment acts to reduce the probability of failure or delay occurrence of a failure, changing settings of other equipment serving a building to compensate for expected equipment downtime, causing packing and shipping of parts to a location, generating work orders, running automated testing or troubleshooting, etc. Equipment failure probabilities can thus be proactively handled (e.g., in an automated manner), thus improving overall equipment operations by reducing occurrences of actual failures and equipment downtime.

Figure 14:
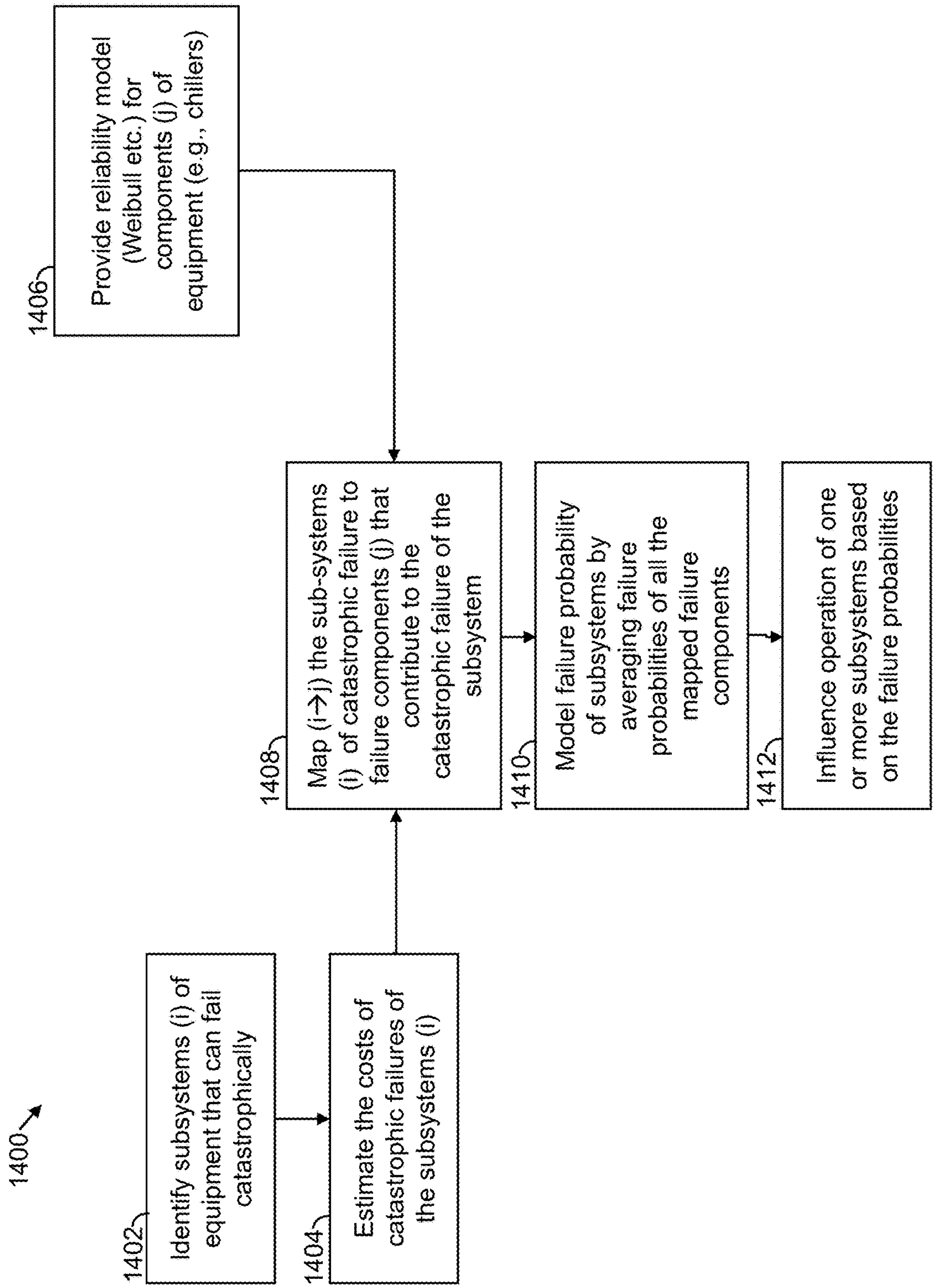
FIG. 14 is a flow diagram illustrating a process of modeling failure probabilities and initiating an automated action using the failure probabilities, according to some embodiments.

Referring now to FIG. 14, a flowchart of a process 1400 relating to modeling failure probabilities and influencing subsystem operation based on the failure probabilities, according to some embodiments. The process 1400 can be executed by the various systems, circuitry, controllers, BMS components, etc. disclosed above, for example by the system 600 including the predictive maintenance system 602 of FIG. 6, in various embodiments. Process 1400 can be executed by one or more processors executing instructions stored on one or more non-transitory media causing the one or more processors to perform the operations of process 1400.

At step 1402, subsystems of equipment that can fail catastrophically are identified. Step 1402 can include performing a scan or assessment of a set of equipment (e.g., of equipment of a BMS, of a group of connected equipment, etc.). The subsystems of equipment can include collections of units of building equipment (e.g., subplants, multiple chillers, multiple boilers, multiple AHUs, an airside subsystem, a waterside subsystem, any arbitrary group or collection of the building equipment, etc.), collections of parts or components of building equipment which may be components of a single unit of building equipment (e.g., a set of components within a single chiller, a single boiler, a single AHU, etc.) or distributed across multiple units of building equipment (e.g., a set of components including a first compressor in a first chiller, a second compressor in a second chiller, and a heating element in a boiler), or any other grouping or set of the building equipment and/or the parts/components thereof. In some embodiments, a single unit of building equipment may include multiple subsystems (e.g., different collections or sets of parts of the unit of building equipment, an electrical subsystem including the electrical parts of the unit of equipment, a fluid subsystem including the fluid parts of the unit of equipment, etc.). In some embodiments, a subsystem may include multiple entire units of building equipment and/or sets of parts/components that exist in multiple units of building equipment. In some embodiments, a subsystem may include all of the components of a single unit of building equipment and no other components (i.e., the unit of building equipment is equivalent to the subsystem). In general, a subsystem may include any arbitrary collection or set of parts, components, or units of equipment, or any other set or grouping of the building equipment and/or the parts/components thereof. In some embodiments, a given subsystem may include a set of parts, components, or units of building equipment that serve a common purpose (e.g., heating, cooling, air circulation, air quality control, lighting, security, etc.).

Subsystems identified at step 1402 as being capable of failing catastrophically may be those which materially affect the ability of the building equipment to affect conditions in a building (temperature, humidity, pressure, etc.), such that failure of the subsystem can be expected to result in undesired (uncomfortable, too cold, too hot, etc.) environmental conditions and costly damage to the equipment. Subsystems identified at step 1402 as being capable of failing catastrophically may, also or alternatively, be subsystems for which failure causes damage beyond only the subsystem (e.g., failure of other subsystems or equipment, physical damage to a building). Subsystems identified at step 1402 as being capable of failing catastrophically may, also or alternatively, be subsystems that can fail suddenly (e.g., a sudden break of a component) as compared to performance degradation over a longer time scale. Step 1402 can include (e.g., automatically) identifying such subsystems (e.g., compiling a list), for example based on the equipment identified as being present in a given scenario and rules, look-up tables, mappings, logic, etc. which provide information about subsystems that can fail catastrophically based on equipment type, model numbers, digital twin information, etc. Any number subsystems can be identified, represented herein as subsystems $i \in \{1, 2, \ldots, N\}$.

At step 1404, the costs of catastrophic failure of the subsystems are estimated. For each subsystem i, a failure objective (e.g., failure cost) $x_i$ can be estimated in step 1404. The failure objective $x_i$ can include labor costs for performing replacement, repair, etc. services in response to failure of the subsystem and costs of any parts, equipment, tools, etc. used for such services. The failure objective $x_i$ may also account for costs associated with repairing damage to other subsystems, to the building, to goods in a building, etc., may penalize downtime, discomfort, or other inconvenience caused by subsystem failure, and may otherwise account for secondary effects of catastrophic failure of the subsystem. Step 1404 can be based on statistical models historical data, expert estimates, user input, etc. in various embodiments.

Process 1400 also includes step 1406 in which reliability models for components of equipment are provided. The reliability models may be trained from warranty data as described elsewhere herein, for example. A reliability model can be provided for a set of identified components of the equipment in a given scenario, including any number of components denoted herein as components $j \in \{1, 2, \ldots, M\}$. In some embodiments, the reliability models are Weibull models.

The reliability models may have the form $F_j(t)=1-e^{-(t/\eta)^{\beta}}$, where $F_j(t)$ is a cumulative distribution function representing the probability of failure of component j up to time t, and $\beta$, $\eta$ are parameters identified using training data and can be different for each component j. The reliability models can also be expressed using a reliability function $R_j(t)=1-F(t)=e^{-(t/\eta)^{\beta}}$ which provides a survival or survivor function, as a probability density function of failure at time t, $$f_j(t) = \frac{dF_j(t)}{dt} = \frac{\beta}{\eta^{\beta}} t^{\beta-1} e^{-(t/\eta)^{\beta}},$$

and/or a hazard rate function providing the instantaneous conditional probability of failure at time t given no failure before t, $$h_j(t) = \frac{f_j(t)}{R(t)} = \frac{\beta}{\eta^{\beta}} t^{\beta-1}.$$

Figure 15:
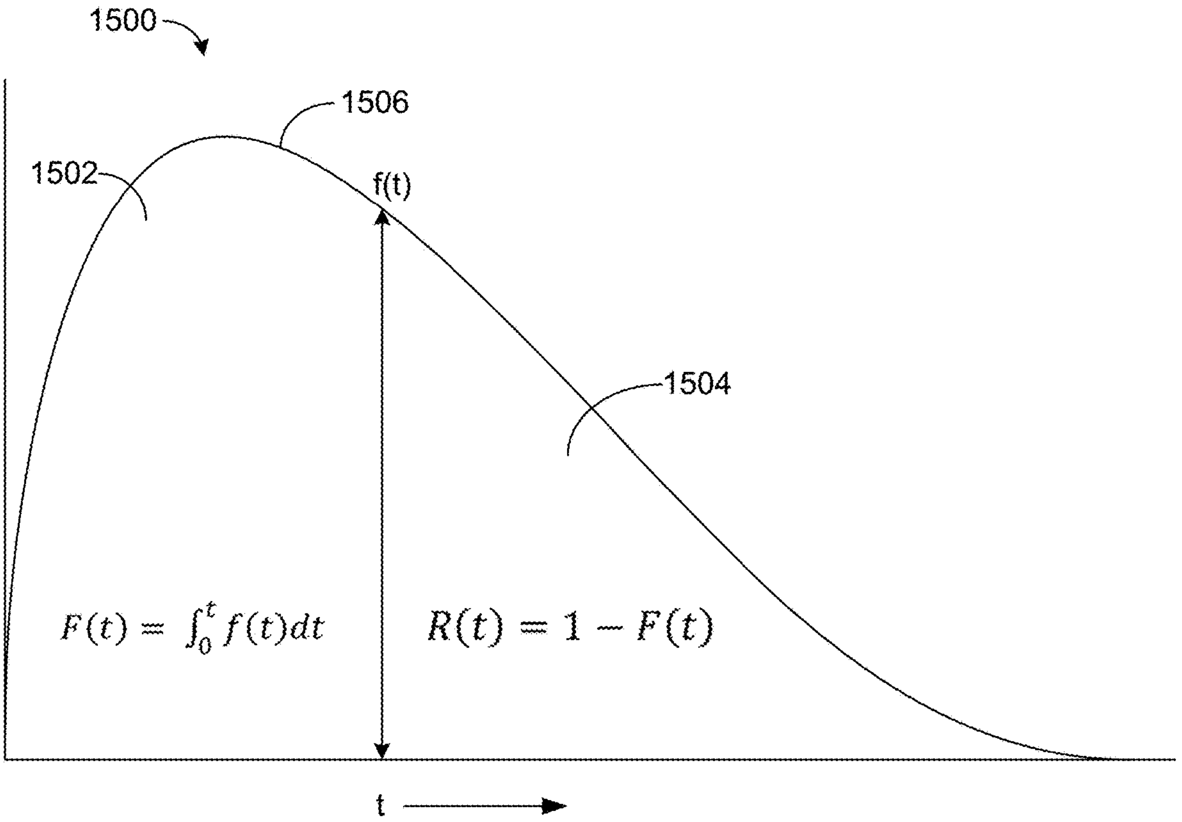
FIG. 15 is a diagram of functions that can be used in the modeling of some embodiments herein, according to some embodiments.

FIG. 15 shows a graph 1500 plotting a probability density function and showing the regions corresponding to the cumulative distribution function $$F(t) = \int_0^t f(t)dt$$

corresponding to a first area 1502 and the reliability function $R(t)=1-F(t)$ corresponding to a second area 1504, to illustrate the shape of such functions according to some embodiments. The first area 1502 is under the $f(t)$ curve 1506 plotted in graph 1500 and before a current time t, and the second area 1504 is under the $f(t)$ curve 1506 plotted in graph 1500 and after the current time t. FIG. 15 thereby illustrates an example function $f(t)$ according to which a failure probability increases as time progresses (i.e., the first area 1502 grows as t moves right) while reliability decreases (i.e., the second area 1504 shrinks as t moves right).

At step 1408, a map of the subsystems i that can fail catastrophically (from step 1402) to the failure components j which can contribute to subsystem catastrophic failure is created. That is, the failure components j are associated with subsystems i (or vice versa) for example such that each subsystem i is associated with multiple failure components j (e.g., components of that subsystem). Such a mapping can be made based on equipment definitions, digital twin information, common data model information, etc. in various embodiments which indicates the relationship between components and subsystems.

At step 1408, failure probability of each subsystem i is modeled using a combination of the reliability models for the components j associated with that subsystem. For example, if Subsystem 1 (i.e., i=1) is associated with Component 1, Component 2, and Component 3 (i.e., j=1, 2, 3), then the failure probability for Subsystem 1 would be modeled in step 1408 as the combination of reliability models for Components 1, 2, and 3 (e.g., $F_1(t)$, $F_2(t)$, $F_3(t)$). In some embodiments, component failure probabilities are averaged to determine the probability of subsystem failure (e.g., $(F_1(t)+F_2(t)+F_3(t))/3$. In some embodiments, component failure probabilities are multiplied together (e.g., $F_1(t)*F_2(t)*F_3(t)$) to obtain a combined probability indicative of the probability of subsystem failure. The probability for the subsystems can be represented as $P_i(t)$. Step 1410 can also include applying values of t (e.g., based on runtime information for equipment as discussed elsewhere herein) to calculate a current value for Pt, for example values of $P_i$ that represent the risk of failure over the next day, next month, next year, etc. in various embodiments.

At step 1412, operation of one or more of the subsystems is influenced based on the failure probabilities of the subsystems (e.g., based on Pt). In some embodiments, step 1412 includes calculating one or more risk values by combining the probabilities $P_i$ with the failure objectives (costs) from step 1404, for example to calculate failure risk for the system as $Risk=\Sigma_i x_i \cdot P_i=(x_1 \cdot P_1+x_2 \cdot P_2+ \ldots)$. In some embodiments, the risk calculations further includes a mark-up, accounting factor, scaling, risk tolerance, etc. that reflects a risk margin or other adjustment, for example such that the risk can be calculated as $\Sigma_i x_i \cdot P_i=(1+\text{Service Margin})$. Step 1412 can include initiation an automated action to mitigate, resolve, reduce, etc. such risk, for example when the calculated risk exceeds a threshold. The threshold may be defined based on a cost of performing such an action, for example such that step 1412 initiates an intervention at such time as it is economically beneficial to do so (i.e., risk reduction greater than cost). Such calculations can also be used to structure a service offering for the building equipment for example determining staffing for a service offering, driving ordering and shipping of parts, pricing contracts, setting warranty terms, generating work orders, proposing services, etc. In some embodiments, step 1412 can include automatically outputting plots, graphs, visualizations, etc. of the various probabilities and/or risks via a graphical user interface (e.g., accessible via a web browser) illustrating to a user (e.g., technician, building owner, sales representative, etc.) the various risks, mitigation options, objectives, etc. to facilitate informed execution of maintenance and service activities that influence equipment operation.

Step 1412 can include influencing operation of the one or more subsystems by automatically changing operating set-points for the one or more subsystems in a manner configured to reduce or delay failure risk or to compensate for expected failures and downtimes.

Step 1412 can include influencing operation of the one or more subsystems by causing performance of maintenance and service tasks, including automatically ordering parts, notifying technicians, generating work orders, etc., where performance of such maintenance and/or service tasks can be proactively executed as part of process 1400 to avoid occurrence of catastrophic subsystem failures and generally reduce risk associated with operations of building equipment. Process 1400 thereby provides for risk management with respect to building equipment in a manner that reduces failures and downtime in an informed, economically feasible, and proactive manner.

To illustrate an example embodiment, the following table illustrates equipment types, subsystems, objectives, probabilities, and risk calculations, according to some embodiments:

| Chiller type | Failures by Subsystem | Cost of Failure | Prob./ Yr. | Annualized Risk |
|---|---|---|---|---|
| YK, YD | Oil Pump | $5,000 | 4% | $200 |
| YK, YZ, YMC2, YD | Motor | $40,000 | 2% | $800 |
| YK, YZ, YMC2, YD | VSD | $60,000 | 4% | $2,400 |
| YK, YD | Motor Bearings | $5,000 | 4% | $200 |
| YK, YD | Compressor Bearings | $50,000 | 3% | $1,250 |
| YK, YZ, YMC2, YD | Evaporator | $3,000 | 2% | $60 |
| YK, YZ, YMC2, YD | Condenser | $3,000 | 4% | $120 |
| YK, YD | Oil Filter | $500 | 4% | $20 |
| YK, YZ, YMC2, YD | Refrigerant | $500 | 4% | $20 |
| | | $— | | $5,070 |

The first (left-most) column indicates equipment models and the second column indicates subsystems of such equipment (e.g., subsystems i). The third column indicates the cost of failure of such subsystem, which can include various objectives (e.g., downtime penalties) and costs of repair/replacement as described above with reference to step 1404 ($x_i$). The fourth column indicates the probability of failure of the corresponding subsystem ($P_i$), for example calculated as in step 1410, shown as quantifying the chance that the subsystem will fail in a given year. The fifth (right-most) column shows the risk for each subsystem resulting from the multiplication of the third column by the fourth column ($x_i*P_i$), with a sum total risk shown in the bottom row. Such a table can be used to determine which subsystems should be serviced to mitigate risk for example when the associated maintenance task costs less than the value shown in the right-most column. For example, if servicing compressor bearings costs less than $1,250 in the example shown and would reset the failure probability to zero, process 1412 can include causing such service to occur because the risk reduction will be greater than the service cost. As another example from the table shown, if servicing an oil filter costs more than $20, such service can be deferred until the probability of failure and thus the associate risk increases to a level sufficient to justify service of such a subsystem. Various such examples are possible with respect to a wide variety of equipment, subsystems, components, plants, buildings, campuses, etc., all within the scope of the present disclosure.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied, and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain operation or group of operations.

Although the figures show a specific order of method steps, the order of the steps may differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. A method for affecting operation of building equipment, comprising:
providing a plurality of reliability models that model failure probabilities of components of the building equipment as functions of equipment runtime, wherein the equipment runtime is determined based at least on an idle time of at least one of the components;
providing associations of the components with a plurality of subsystems of the building equipment;
calculating, for the plurality of subsystems of the building equipment, probabilities of subsystem failure based on the reliability models for the components and the associations; and
initiating an automated action to affect operation of the building equipment and delay occurrence of the subsystem failure based on the probabilities of subsystem failure, the automated action comprising at least one of:
operating the building equipment in accordance with a modified operating setpoint that reduces a rate of energy consumption by at least one of the components; or
causing maintenance to be performed on the building equipment that affects the operation of the building equipment.

2. The method of claim 1, further comprising:
generating a first recommendation based on the probabilities of subsystem failure; and
generating a second recommendation based on age of the building equipment;
wherein the automated action is initiated based on both the first recommendation and the second recommendation.

3. The method of claim 1, further comprising identifying parameter values for the plurality of reliability models based on warranty data indicating at least one of historical instances of component or subsystem failure.

4. The method of claim 1, further comprising calculating a risk by multiplying at least one of the probabilities of subsystem failure by a cost of subsystem failure.

5. The method of claim 4, wherein initiating the automated action is performed in response to the risk exceeding a threshold.

6. The method of claim 4, wherein initiating the automated action is performed in response to the risk exceeding an expected cost of mitigating the risk.

7. The method of claim 4, further comprising estimating the cost of subsystem failure based on historical data.

8. The method of claim 1, further comprising structuring a service offering for the building equipment based on the probabilities of subsystem failure.

9. The method of claim 8, wherein structuring the service offering comprises allocating resources to the service offering based on the probabilities of system failure.

10. The method of claim 1, further comprising:
identifying a subset of the subsystems for which the probabilities of subsystem failure exceed a threshold;
wherein the automated action comprises causing performance of maintenance on the subset of the subsystems.

11. The method of claim 1, further comprising repeatedly updating the probabilities of failure over time based on runtime data provided by the building equipment.

12. The method of claim 1, wherein the automated action is predicted to reduce the failure probabilities of components of the building equipment or the probabilities of subsystem failure before occurrence of a failure.

13. The method of claim 1, wherein the plurality of reliability models are Weibull models.

14. One or more non-transitory computer-readable media storing program instructions that, when executed by one or more processors, cause the one or more processors to perform operations comprising:
providing a plurality of reliability models that model failure probabilities of building equipment as functions of equipment runtime, the equipment runtime being determined based at least on an idle time of the building equipment;
generating a first service recommendation for a subsystem-based on data-driven modeling of subsystem failure probability;
generating a second service recommendation for the subsystem using a predefined service schedule based on age of equipment of the subsystem; and
providing a combined output based on the first service recommendation and the second service recommendation, wherein the output is automatically applied to:
operate the building equipment in accordance with a modified operating setpoint that reduces a rate of energy consumption by the building equipment; or
cause maintenance to be performed on the building equipment that affects operation of the building equipment.

15. The one or more non-transitory computer-readable media of claim 14, wherein the operations further comprise performing the data-driven modeling of the subsystem failure probability by:
providing associations of the building equipment with a plurality of subsystems comprising the subsystem; and
calculating, for the plurality of subsystems, probabilities of subsystem failure based on the reliability models for the components building equipment and the associations.

16. A building equipment system, comprising:
a subsystem comprising a plurality of components;
one or more processors; and
one or more non-transitory computer readable media storing program instructions that, when executed by the one or more processors, cause the one or more processors to perform operations comprising:
providing a plurality of reliability models that model failure probabilities of the plurality of components as functions of runtime, wherein the runtime is determined based at least on an idle time of at least one of the components;
determining a probability of failure of the subsystem at a time step based on the reliability models for the components; and
generating an output to influence operation of the subsystem based on the probability of failure of the subsystem, wherein the output is automatically applied to:
operate at least one of the components in accordance with a modified operating setpoint that reduces a rate of energy consumption by at least one of the components; or
cause maintenance to be performed on the at least one of the components that affects the operation of the subsystem.

17. The building equipment system of claim 16, wherein generating the output to influence the operation of the subsystem is further based on a schedule of services to provide to the subsystem at different ages of the subsystem.

18. The building equipment system of claim 16, wherein the operations further comprise calculating a risk by multiplying the probability of failure of the subsystem by a cost of subsystem failure and generating the output in response to the risk exceeding a threshold.

19. The method of claim 1, wherein the rate of energy consumption is reduced by adjusting a speed of a fan or adjusting a position of a valve.

* * * * *